(12) United States Patent
Cho et al.

(10) Patent No.: US 9,571,732 B2
(45) Date of Patent: *Feb. 14, 2017

(54) DISPLAY DEVICE AND METHOD FOR CONTROLLING THE SAME

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 711 days.

This patent is subject to a terminal disclaimer.

(21) Appl. No.: 13/937,814

(22) Filed: Jul. 9, 2013

(65) Prior Publication Data

US 2014/0285618 A1 Sep. 25, 2014

Related U.S. Application Data

(60) Provisional application No. 61/804,170, filed on Mar. 21, 2013.

(30) Foreign Application Priority Data

May 28, 2013 (KR) ................ 10-2013-0060267

(51) Int. Cl.
*H04N 7/00* (2011.01)
*H04N 5/232* (2006.01)
*H04N 5/225* (2006.01)

(52) U.S. Cl.
CPC ........ *H04N 5/23238* (2013.01); *H04N 5/2258* (2013.01); *H04N 5/23293* (2013.01)

(58) Field of Classification Search
CPC ............ H04N 5/23238; H04N 5/23293; H04N 5/2258
USPC ................................ 348/36, 38; 345/1.3, 672
See application file for complete search history.

(56) References Cited

U.S. PATENT DOCUMENTS

| | | |
|---|---|---|
| 2004/0008191 A1 | 1/2004 | Poupyrev et al. |
| 2004/0056966 A1 | 3/2004 | Schechner et al. |
| 2008/0024614 A1 | 1/2008 | Li et al. |
| 2008/0225129 A1 | 9/2008 | Viinikanoja et al. |
| 2008/0291225 A1 | 11/2008 | Arneson |
| 2008/0303782 A1 | 12/2008 | Grant et al. |
| 2009/0058988 A1* | 3/2009 | Strzempko ............ G06T 3/4038 348/36 |
| 2009/0079730 A1 | 3/2009 | Lee et al. |
| 2009/0148149 A1 | 6/2009 | Chishima |

(Continued)

FOREIGN PATENT DOCUMENTS

| | | |
|---|---|---|
| CN | 1451230 A | 10/2003 |
| CN | 1922894 A | 2/2007 |

(Continued)

*Primary Examiner* — Gims Philippe
*Assistant Examiner* — Richard Carter
(74) *Attorney, Agent, or Firm* — Birch, Stewart, Kolasch & Birch, LLP

(57) ABSTRACT

A display device and a method for controlling the same are disclosed in which a threshold range for generating a panorama image is indicated in accordance with a bending angle of a bending portion provided between a first area of a body provided with a first camera and a second area of a body provided with a second camera, whereby the panorama image may be generated using the first camera and the second camera.

19 Claims, 21 Drawing Sheets

(56) References Cited

U.S. PATENT DOCUMENTS

| | | |
|---|---|---|
| 2009/0174679 A1 | 7/2009 | Westerman |
| 2009/0295789 A1 | 12/2009 | Yao et al. |
| 2010/0066643 A1 | 3/2010 | King et al. |
| 2010/0079355 A1 | 4/2010 | Kilpatrick, II et al. |
| 2010/0117975 A1 | 5/2010 | Cho |
| 2010/0118116 A1 | 5/2010 | Tomasz et al. |
| 2010/0182265 A1 | 7/2010 | Kim et al. |
| 2010/0251112 A1 | 9/2010 | Hinckley et al. |
| 2010/0321470 A1 | 12/2010 | Oshima |
| 2011/0007130 A1* | 1/2011 | Park ............ H04N 7/181 348/38 |
| 2012/0105579 A1 | 5/2012 | Jeon et al. |
| 2012/0235894 A1 | 9/2012 | Phillips |
| 2012/0262367 A1 | 10/2012 | Chiu et al. |
| 2012/0262407 A1 | 10/2012 | Hinckley et al. |
| 2012/0306933 A1* | 12/2012 | Osako ............ A63F 13/10 345/672 |
| 2013/0016181 A1* | 1/2013 | Penner ............ G06T 3/4038 348/38 |
| 2013/0033434 A1 | 2/2013 | Richardson et al. |
| 2013/0044240 A1 | 2/2013 | Leskela et al. |
| 2013/0120239 A1 | 5/2013 | Suzuki et al. |
| 2013/0163817 A1 | 6/2013 | Porter et al. |
| 2013/0229324 A1* | 9/2013 | Zhang ............ G09G 5/00 345/1.3 |

FOREIGN PATENT DOCUMENTS

| | | |
|---|---|---|
| CN | 101601277 A | 12/2009 |
| CN | 101681525 A | 3/2010 |
| CN | 101930162 A | 12/2010 |
| CN | 102150096 A | 8/2011 |
| CN | 102150126 A | 8/2011 |
| EP | 2207076 A2 | 7/2010 |
| JP | 2004-235926 A | 8/2004 |
| JP | 2011-4340 A | 1/2011 |
| JP | 2012-159616 A | 8/2012 |
| KR | 10-2012-0045850 A | 5/2012 |
| KR | 10-2012-0106019 A | 9/2012 |

* cited by examiner

FIG. 11
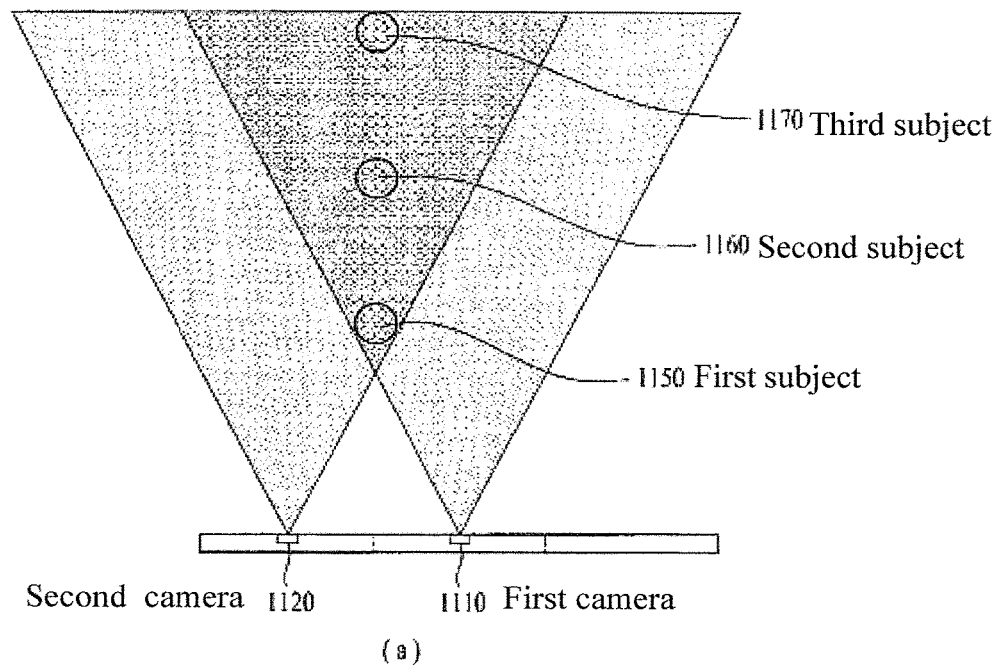
(a)
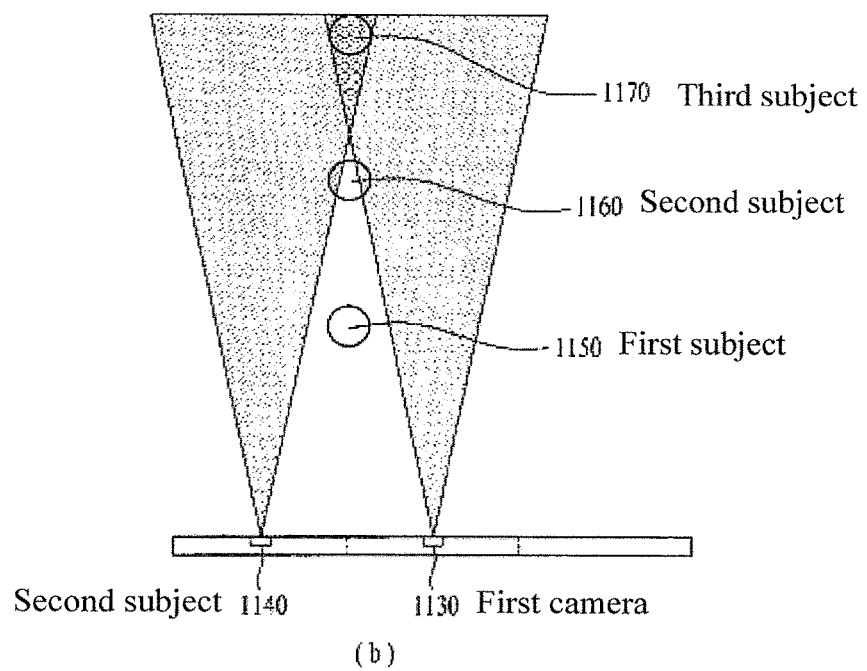
(b)

FIG. 12
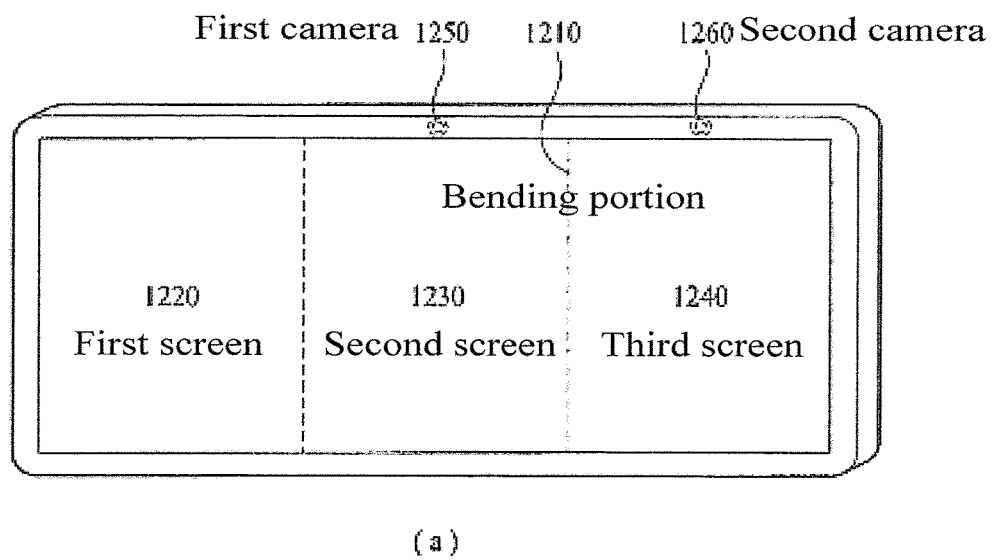
(a)
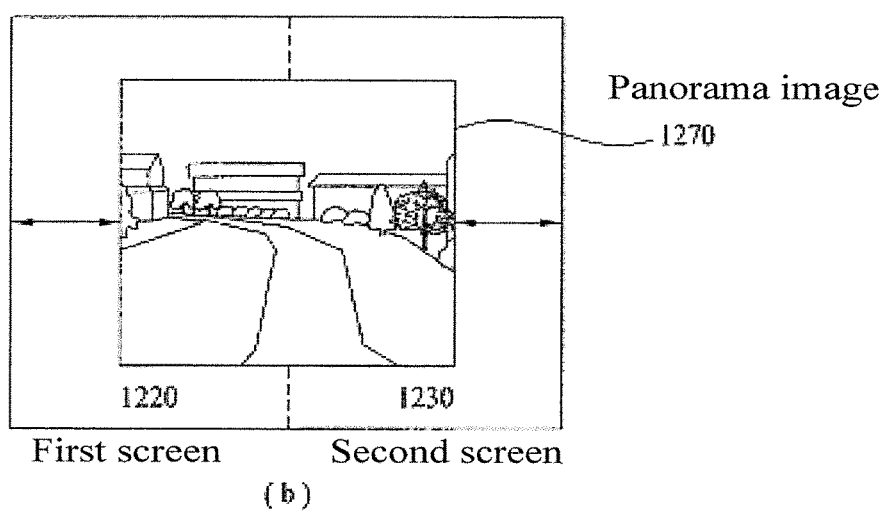
(b)

FIG. 13
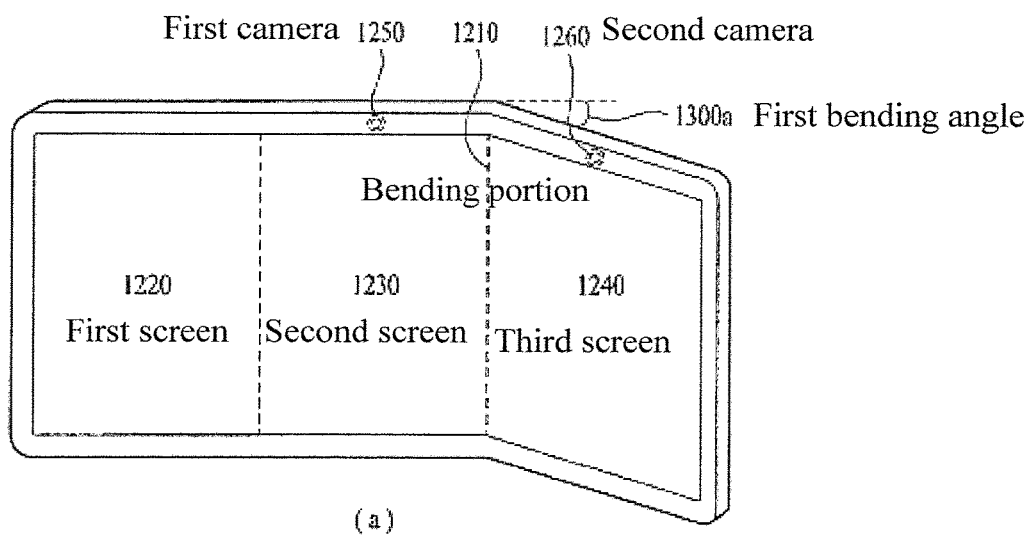
(a)
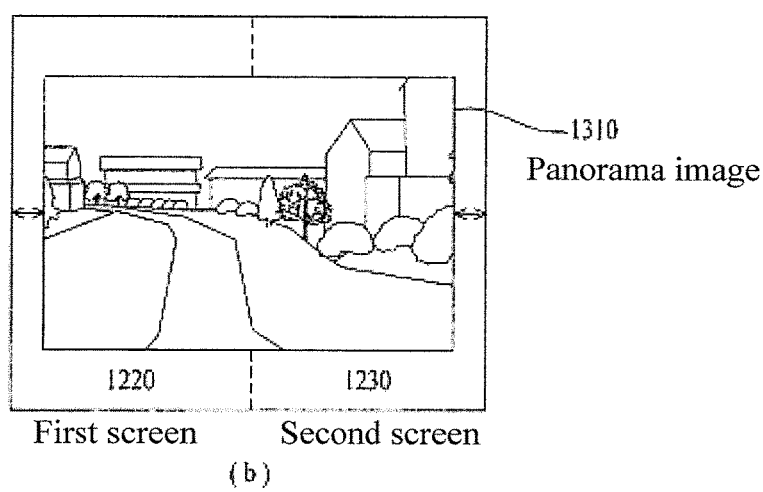
(b)

FIG. 14
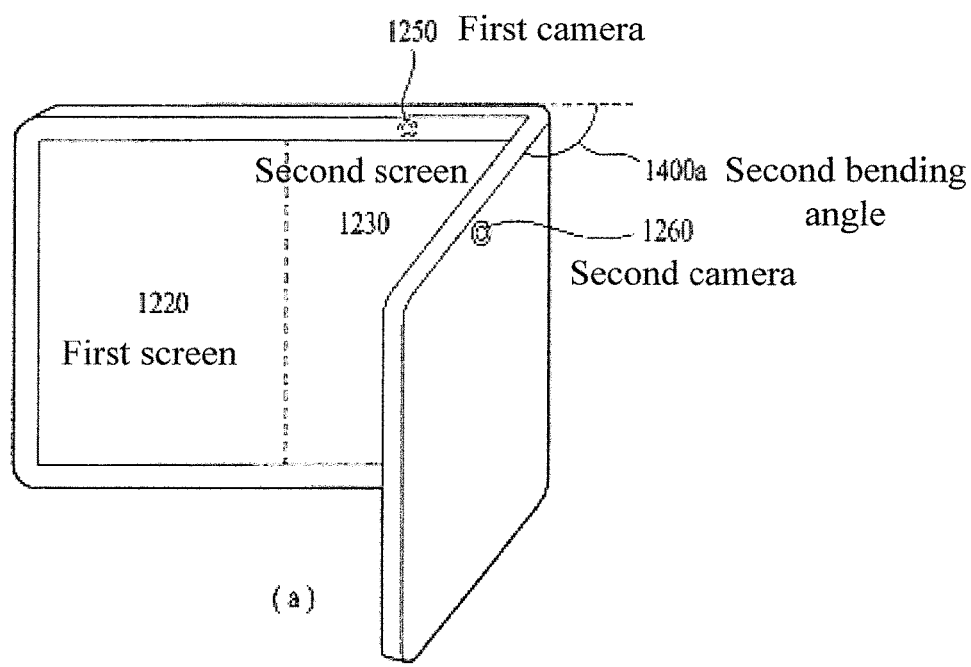
(a)
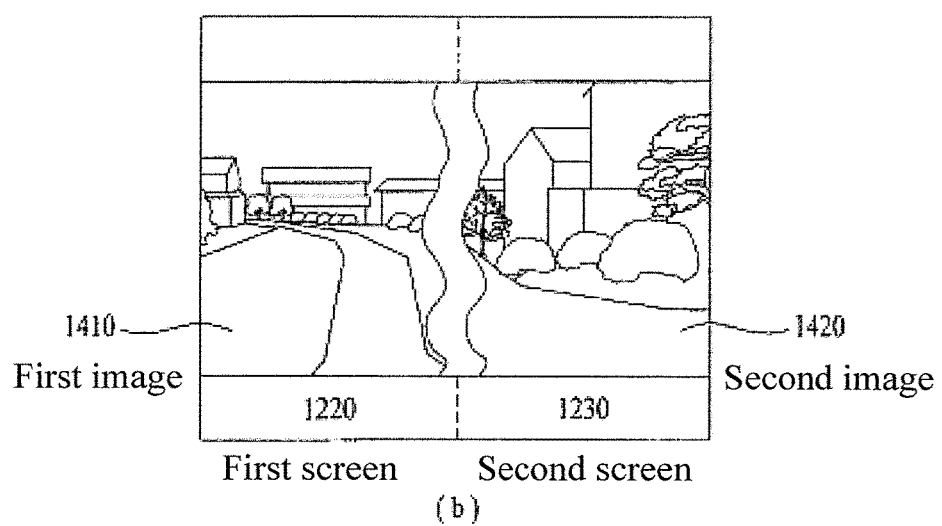
(b)

FIG. 15
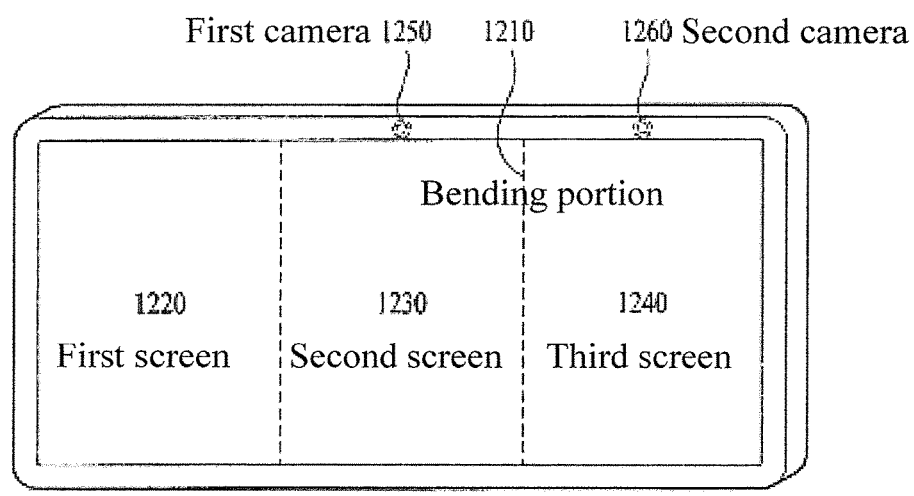
(a)
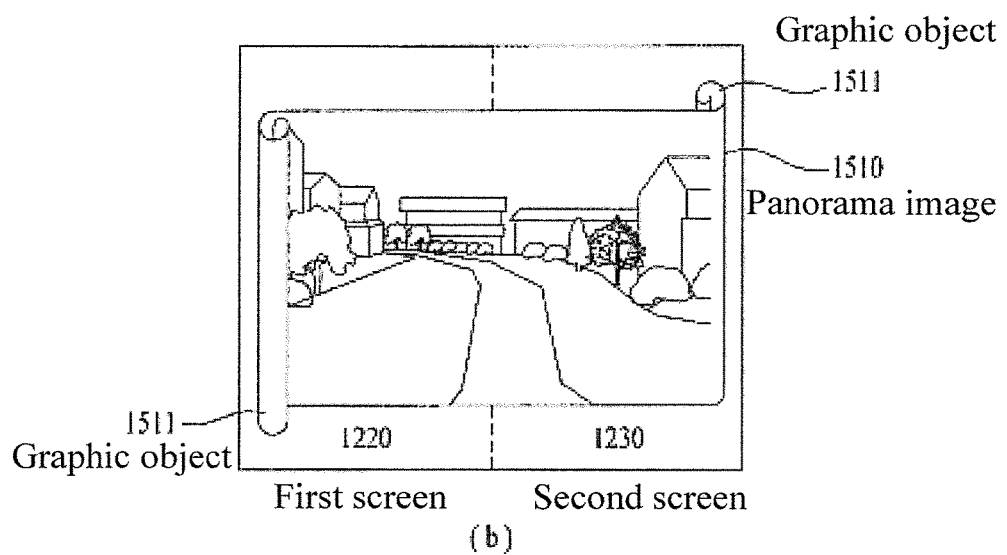
(b)

FIG. 16
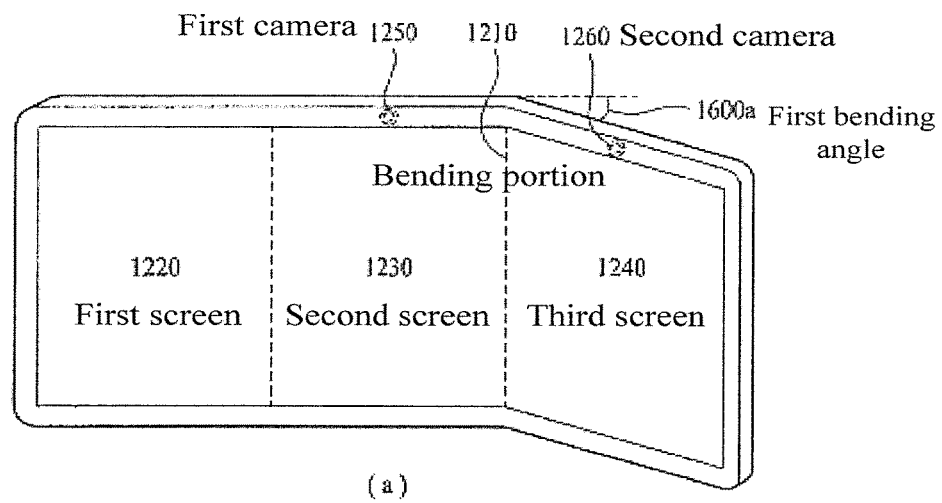
(a)
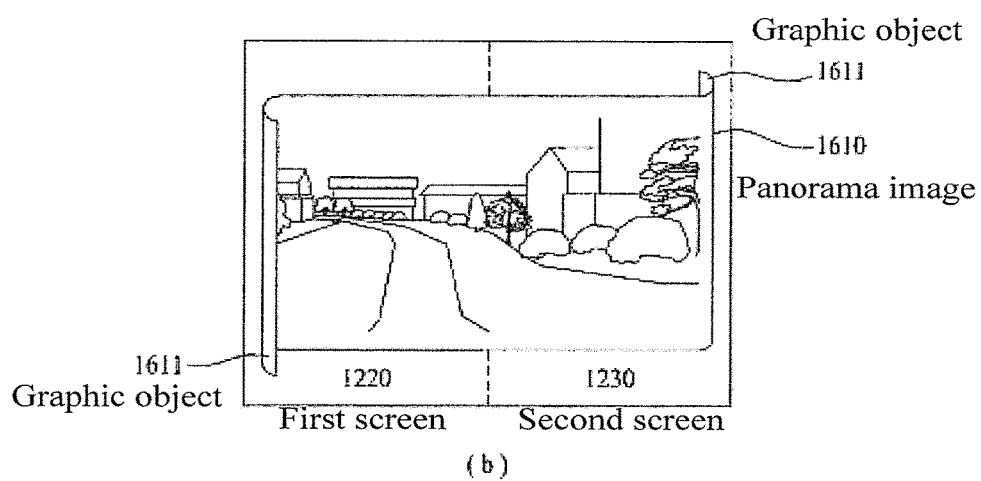
(b)

FIG. 17
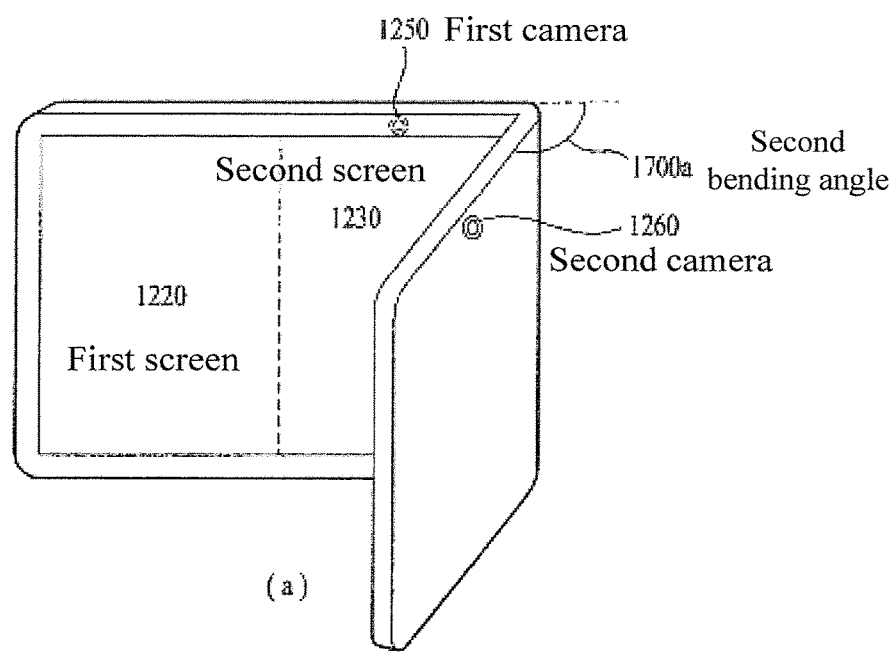
(a)
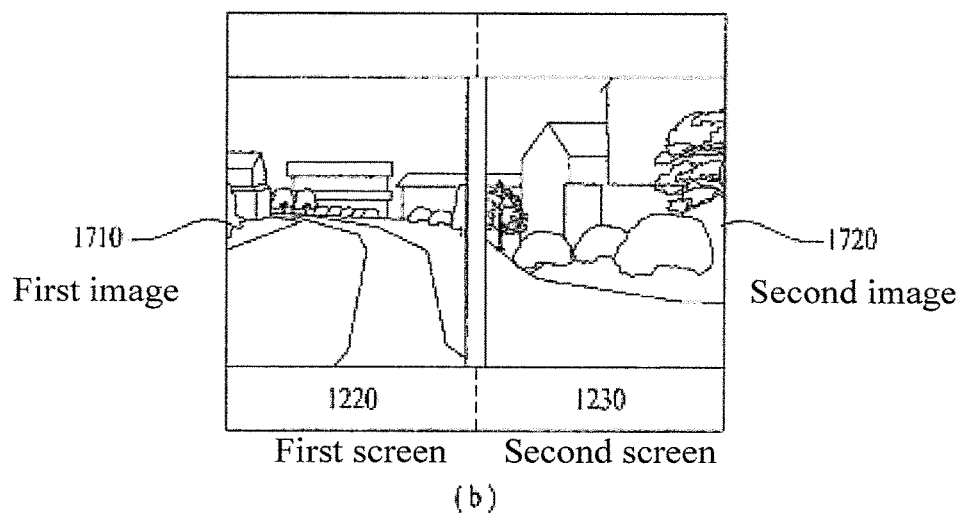
(b)

FIG. 18
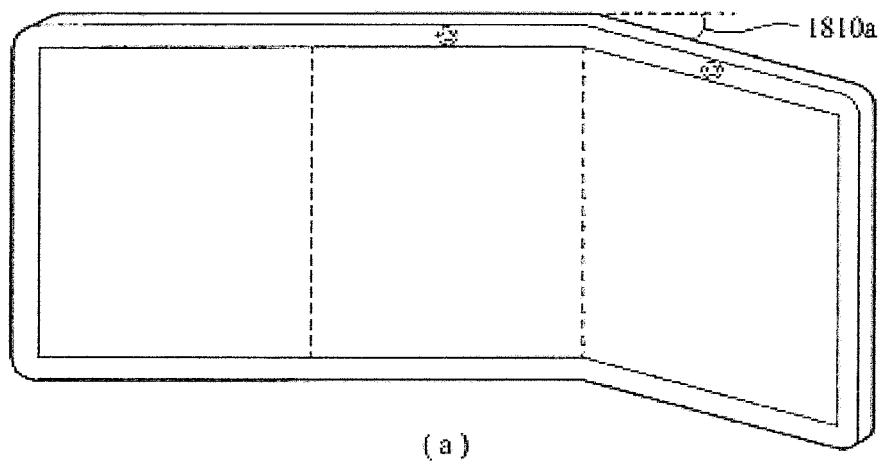
(a)
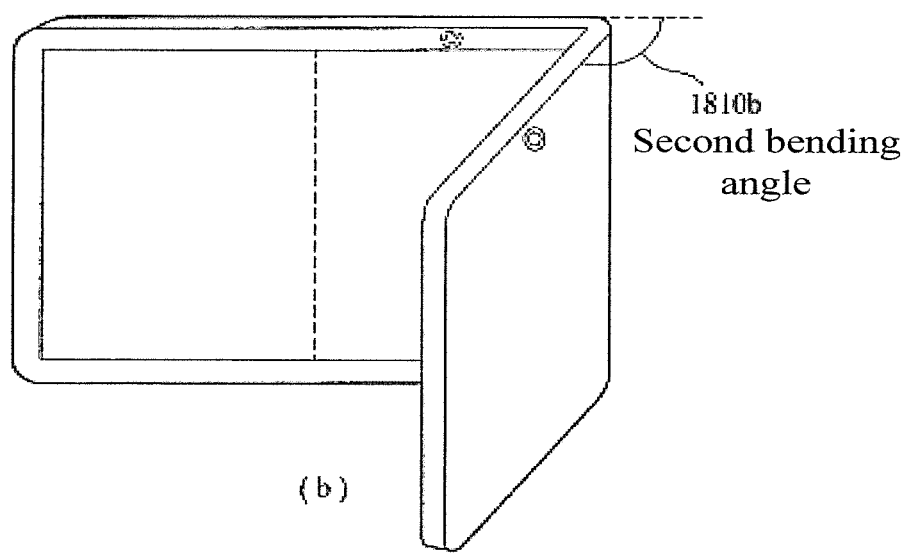
(b)

FIG. 19
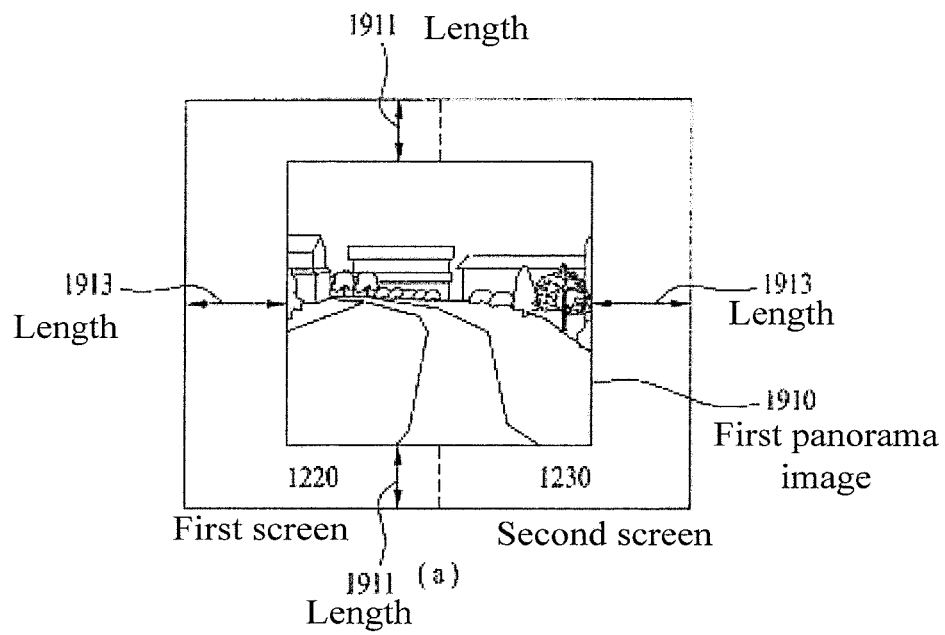
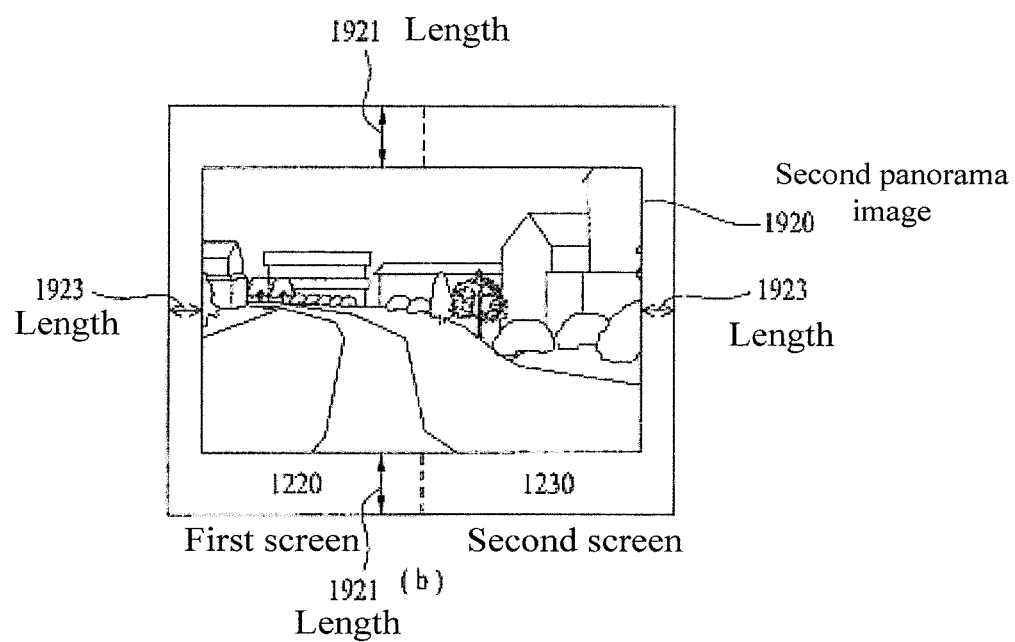

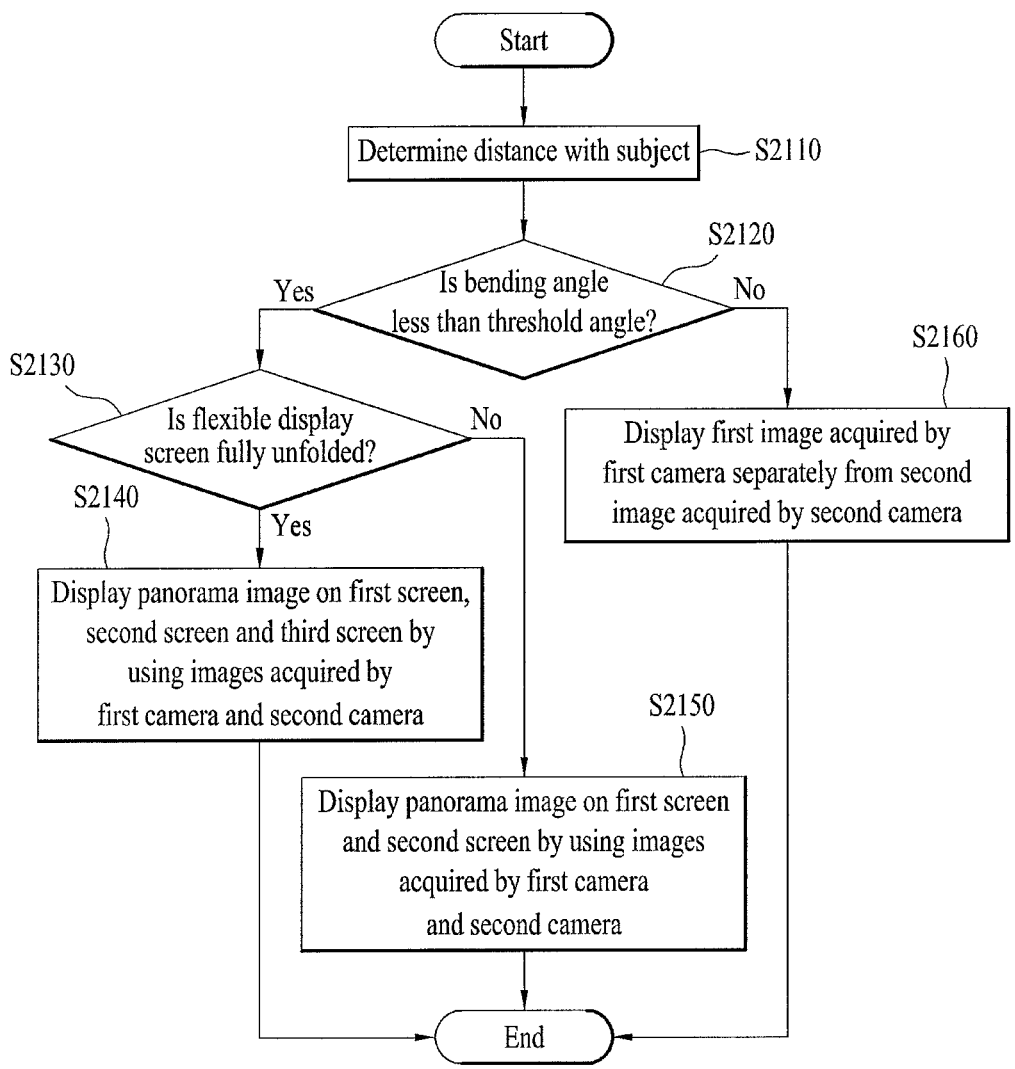

DISPLAY DEVICE AND METHOD FOR CONTROLLING THE SAME

This application claims the benefit of the U.S. Provisional Patent Application No. 61/804,170, filed on Mar. 21, 2013 and the Korean Patent Application No. 10-2013-0060267, filed on May 28, 2013, the contents of all of these applications are hereby incorporated by reference as if fully set forth herein.

BACKGROUND OF THE INVENTION

Field of the Invention

The present specification relates to a display device and a method for controlling the same, and more particularly, to a display device and a method for controlling the same, in which a threshold range for generating a panorama image is indicated in accordance with a bending angle of a bending portion provided between a first area of a body provided with a first camera and a second area of a body provided with a second camera, whereby the panorama image may be generated using the first camera and the second camera.

Discussion of the Related Art

Recently, a display device provided with a camera has launched, a user may easily take pictures at any place at any time. In addition, the user may store a view of a wide range as one panorama image by rotating a display device in a horizontal or vertical direction on the basis of a fixed axis and taking images. In other words, the display device may generate one panorama image by taking a plurality of images and attaching the images longitudinally.

However, since the user takes images by rotating the display device in a horizontal or vertical direction on the basis of a fixed axis, a time difference may occur. For example, there may occur an unexpected factor like that a person passes by in the middle of taking a first image and a second image. In this case, a problem may occur in that the display device may not generate the panorama image normally.

SUMMARY OF THE INVENTION

Accordingly, the present specification is directed to a display device and a method for controlling the same, which substantially obviate one or more problems due to limitations and disadvantages of the related art.

An object of the present specification is to provide a display device and a method for controlling the same, in which a panorama image may be generated even though a user does not rotate the display device in a horizontal or vertical direction on the basis of a fixed axis.

Another object of the present specification is to provide a display device and a method for controlling the same, in which a panorama image may be generated using a bending portion provided between a first area of a body provided with a first camera and a second area of a body provided with a second camera.

Still another object of the present specification is to provide a display device and a method for controlling the same, in which a threshold range, which may generate a panorama image, is indicated in accordance with a bending angle of a bending portion.

Further still another object of the present specification is to provide a display device and a method for controlling the same, in which display attributes of a panorama image are adjusted in accordance with a bending angle and then displayed, whereby a panorama image related to the bending angle is provided.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a display device comprises a body configured to include a first area, a second area and a bending portion between the first area and the second area; a first camera configured to be provided in a first area; a second camera configured to be provided in a second area, the first camera and the second camera being provided at a first side of the display device; a display unit configured to display images acquired through the first camera and the second camera; and a processor configured to control the first camera, the second camera and the display unit. In this case, the processor is further configured to acquire a bending angle of the bending portion, determine a threshold range from the bending angle to a threshold angle, wherein the threshold angle is a specific bending angle of the bending portion to generate a single panorama image by using a first image acquired from the first camera and a second image acquired from the second camera, generate the panorama image by using the first image and the second image if the bending angle is smaller than the threshold angle, and indicate the threshold range by adjusting display attributes of the panorama image in accordance with the threshold range.

In another aspect, a method for controlling a display device, which includes a body configured to include a first area, a second area and a bending portion between the first area and the second area, comprises the steps of acquiring a bending angle of a bending portion; determining a threshold range from the bending angle to a threshold angle, wherein the threshold angle is a specific bending angle of the bending portion to generate one panorama image by using a first image acquired from a first camera and a second image acquired from a second camera; generating the panorama image by using the first image and the second image if the bending angle is smaller than the threshold angle; and indicating the threshold range by adjusting display attributes of the panorama image in accordance with the threshold range.

In other aspect, a display device comprises a body configured to include a first area, a second area, and a bending portion between the first area and the second area; a first camera configured to be provided in a first area; a second camera configured to be provided in a second area, the first camera and the second camera being provided at a first side of the display device; a display unit configured to display images acquired through the first camera and the second camera; and a processor configured to control the first camera, the second camera and the display unit. In this case, the processor is further configured to generate a first panorama image by using a first image acquired from the first camera and a second image acquired from the second camera, if the bending portion corresponds to a first bending angle, display the first panorama image on a first display area, generate a second panorama image by using the first image and the second image, if the bending portion corresponds to a second bending angle and display the second panorama image on a second display area, wherein a first vertical length of the first display area is equal to a second vertical length of the second display area, and a first horizontal length of the first display area is equal to a second horizontal length of the second display area.

According to one embodiment, the display device may generate the panorama image in a fixed direction even though it is not rotated in a horizontal or vertical direction on the basis of a fixed axis. Accordingly, the display device according to one embodiment may avoid a case where the display device fails to generate the panorama image due to a factor like that a person passes by while the display device is being rotated.

Also, according to another embodiment, the display device may indicate a bending angle of a bending portion that may generate the panorama image. Accordingly, the user may easily identify the bending angle, which is varied depending on magnification of a camera and a distance with a subject and may generate the panorama image.

Also, according to still another embodiment, the user may easily generate the panorama image by indicating a threshold range which may generate a panorama image.

Also, according to further still another embodiment, the display device may adjust display attributes of the generated panorama image in accordance with the bending angle and then display the adjusted display attributes. Accordingly, through the panorama image only, the user may easily determine whether the bending angle should be greater or smaller.

More detailed advantageous effects will be described hereinafter.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 11 is a diagram illustrating an example that a field of view area is varied depending on a zoom magnification of a camera;

FIG. 12 is a diagram illustrating an example that a display device which is not bent displays a panorama image;

FIG. 13 is a diagram illustrating an example that a display device bent at a first angle displays a panorama image;

FIG. 14 is a diagram illustrating an example that a display device bent at a second angle provides a user interface;

FIG. 15 is a diagram illustrating an example that a display device which is not bent provides an indicator;

FIG. 16 is a diagram illustrating an example that a display device bent at a first angle provides an indicator;

FIG. 17 is a diagram illustrating another example that a display device bent at a second angle provides a user interface;

FIG. 18 is a diagram illustrating an example of a display device bent at a first angle and a second angle;

FIG. 19 is a diagram illustrating an example of a panorama image displayed in accordance with a bending angle of FIG. 18;

FIG. 21 is a flow chart illustrating a method for controlling a display device according to another embodiment.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Moreover, although the embodiments will be described in detail with reference to the accompanying drawings and the disclosure described by the drawings, it is to be understood that the present specification is not limited by such embodiments.

In the meantime, a display device disclosed in this specification may include various types of display devices, such as a personal computer (PC), a personal digital assistant (PDA), a notebook computer, a tablet PC, and a smart phone, which may display images. Also, in this specification, the display device may include a touch screen.

Figure 1:
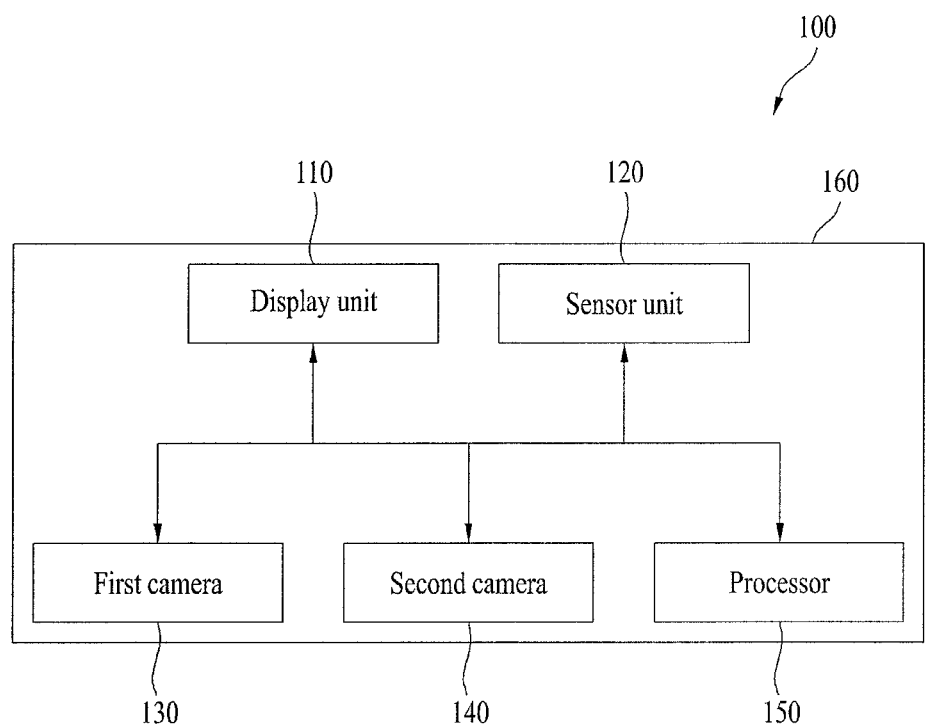
FIG. 1 is a functional block diagram illustrating a display device according to one embodiment.

FIG. 1 is a functional block diagram illustrating a display device according to one embodiment. FIG. 1 is only exemplary and some modules may be deleted or new modules may be additionally provided in accordance with the need of the person with ordinary skill in the art.

As shown in FIG. 1, a display device 100 according to one embodiment may include a display unit 110, a sensor unit 120, a first camera 130, a second camera 140, and a processor 150.

Also, the display device 100 may include a body 160 provided with the display unit 110, the sensor unit 120, the first camera 130, the second camera 140 and the processor 150. The body 160 may include a first area and a second area, wherein a bending portion may be provided between the first area and the second area.

Also, the first camera 130 may be provided in the first area of the body 160, and the second camera 140 may be provided in the second area of the body 160. Accordingly, the display device may identify an angle of a direction, in which the first camera 130 and the second camera 140 take images, by sensing a bending angle of a bending portion. This will be described in more detail with reference to FIG. 2 to FIG. 3.

The display unit 110 may output the images acquired through the first camera 130 and the second camera 140 on a display screen. Also, the display unit 110 may output the images on the basis of contents or applications implemented by the processor 150 or a control command of the processor 150.

Also, the display unit 110 may include a flexible display screen. Accordingly, the display unit 100 may bend the display device on the basis of the bending portion, whereby the flexible display screen may be bent.

The sensor unit 120 may sense a periphery environment of the display device 100 by using at least one sensor provided in the display device 100, and may forward the sensed result to the processor 150 as a signal type. Also, the sensor unit 120 may sense a user input and forward a signal based on the sensed result to the processor 150. At this time, the processor 150 may detect a signal generated by the user input, such as a signal forwarded from a touch sensor, among many signals received therein.

Accordingly, the sensor unit 120 may include at least one sensing means. In one embodiment, the at least one sensing means may include a gravity sensor, a terrestrial magnetism sensor, a motion sensor, a gyroscope sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a video sensor, a global positioning system (GPS) sensor, a touch sensor, and a grip sensor.

As a result, the sensor unit 120 may sense a bending angle of a bending portion provided between the first area of the body 160 and the second area of the body 160. The bending angle means an angle obtained as the display device of a full body screen state is bent. When the bending angle of the display device of the full body screen state is defined as 0 degree, it is defined that the bending angle becomes great as the display device is bent.

Also, the sensor unit 120 refers to the aforementioned various sensing means, and may sense various inputs of a user and the environment of the display device 100 and forward the sensed result to the processor 150, whereby the processor 150 may perform the operation based on the sensed result. Also, the aforementioned sensors may be included in the display device 100 as separate elements, or may be incorporated into at least one element.

Also, if the aforementioned display unit 110 includes a touch sensitive display, the display device 100 may sense a user input such as a touch input through the display unit 120.

Accordingly, the processor 150 may recognize the signal based on the user input forwarded from at least one of the sensor unit 120 and the display unit 110 and control the display device 100 in accordance with the signal.

In other words, the processor 150 may detect the signal through at least one of the sensor unit 120 and the display unit 120 among the signals forwarded from the units of the display device. Namely, the processor 150 may detect the signal generated by the user input received from a specific sensor, among many signals received therein. For example, if the sensor unit 120 senses the input of the user, the processor 150 may detect the signal corresponding to the input by using the sensed result.

Hereinafter, if each step or operation performed by the display device starts or is performed through the user input, it is to be understood that the procedure of generating the signal in accordance with the user input is included in the aforementioned description.

Also, it may be expressed that the processor controls the display device or the units included in the display device in accordance with the user input. The processor may be described to mean the display device.

In addition, although not shown in FIG. 1, the display device may further include at least one of a storage unit, a communication unit, audio input and output units, and a power unit.

The storage unit may store various digital data such as audio, photos, moving pictures, and applications. The storage unit refers to various digital data storage areas, such as a flash memory, a random access memory (RAM), and a solid state drive (SSD).

Also, the storage unit may temporarily store data received from an external device through the communication unit. At this time, the storage unit may be used for buffering for outputting the data, which are received from the external device, from the display device 100. Also, the storage unit may store contents displayed in the display device 100. In this case, the storage unit may selectively be provided on the display device 100.

The communication unit may transmit and receive data to and from the external device by performing communication with the external device by using various protocols. Also, the communication unit may transmit and receive digital data such as contents and applications to and from an external network by accessing the external network through wire or wireless.

The audio output unit includes an audio output means such as a speaker and earphone. Also, the audio output unit may output voice on the basis of contents implemented in the processor 150 or the control command of the processor 150. At this time, the audio output unit may selectively be provided on the display device 100.

The power unit is a power source connected with a battery inside the display device 100 or an external power, and may supply the power to the display device 100.

Also, the display device 100 is shown in FIG. 1 as a block diagram. In FIG. 1, respective blocks are shown to logically identify the elements of the display device. Accordingly, the aforementioned elements of the display device may be provided as one chip or a plurality of chips in accordance with design of the display device.

In the meantime, the display device according to one embodiment may include a body and a flexible display screen supported by the body. The flexible display screen may be supported by the body and bent together with the body as the body is bent in a predetermined direction.

Accordingly, the display device according to one embodiment may be rotated and bent on the basis of a predetermined area of the body. In other words, the display device may be bent on the basis of the predetermined area of the body. The body is divided into at least two areas, and may include at least one bending portion provided between the divided body areas.

Figure 2:
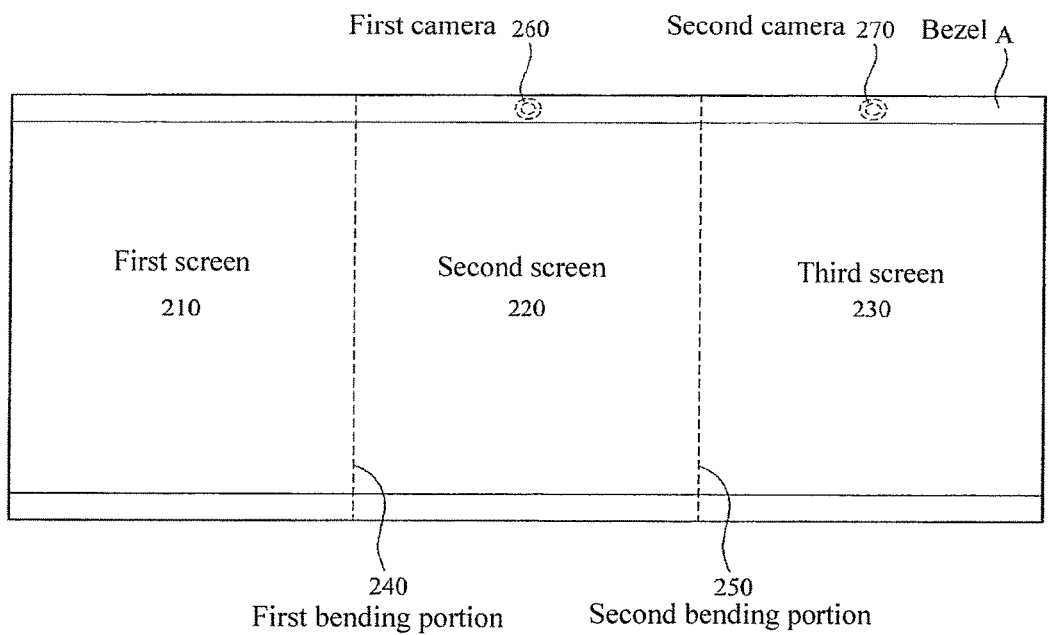
FIG. 2 is a front view illustrating a display device according to one embodiment.
Figure 3:
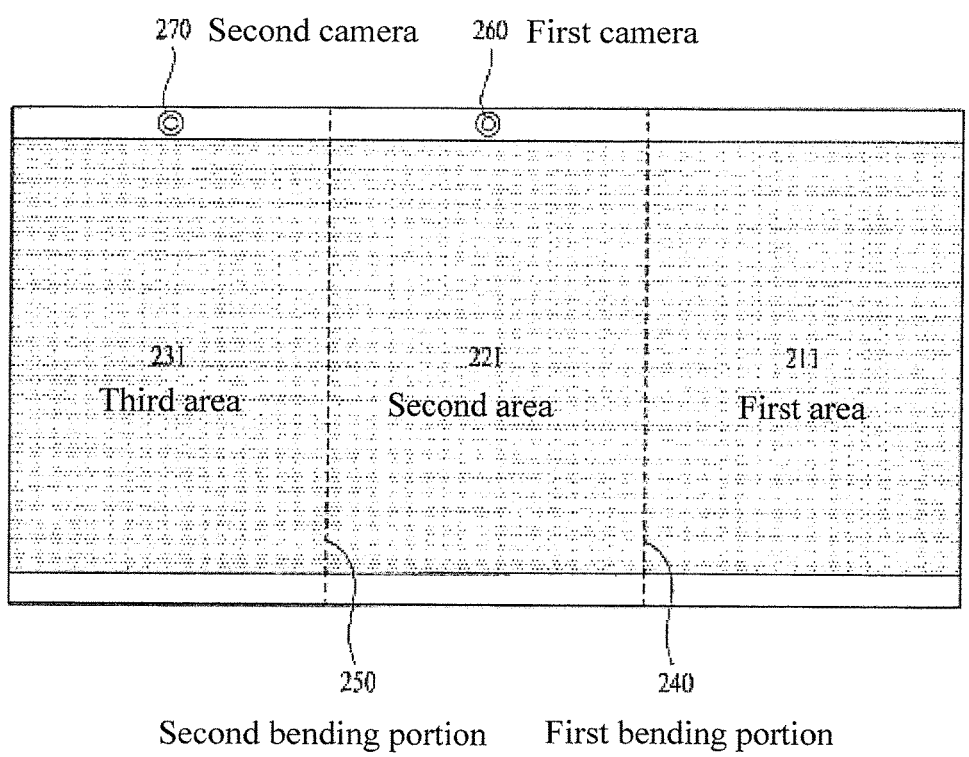
FIG. 3 is a rear view illustrating a display device of FIG. 2.

FIG. 2 is a front view illustrating a display device according to one embodiment, wherein the display device includes two bending portions. Also, FIG. 3 is a rear view illustrating a display device of FIG. 2. The display device according to one embodiment will be described with reference to FIG. 2 and FIG. 3.

As shown in FIG. 2, the flexible display screen may be divided into a first screen 210, a second screen 220 and a third screen 230 by a first bending portion 240 and a second bending portion 250. Also, as shown in FIG. 3, the body that supports the flexible display screen may be divided into a first area 211, which supports the first screen 210, a second area 221, which supports the second screen 220, and a third area 231, which supports the third screen 230, by the first bending portion 240 and the second bending portion 250.

Also, the display device may include at least two cameras in at least two areas of the first area 211 to the third area 231. For example, the display device may include a first camera 260 at a bezel (A) area corresponding to the second area 221, and may include a second camera 270 at a bezel (A) area corresponding to the third area 231.

FIG. 2 and FIG. 3 illustrate an example of the display device that includes the first camera 260 and the second camera 270 at an opposite side of the flexible display screen. Accordingly, the first camera 260 and the second camera 270 may be used as front cameras or rear cameras in accordance with structural features of the display device or the location of the user.

For example, as shown in FIG. 2, if the display device forms a full body screen in which the first screen 210, the second screen 220 and the third screen 230 of the flexible display screen are all unfolded, the first camera 260 and the second camera 270 may be used as the rear cameras. On the other hand, the display device of which second bending portion 250 is bent may use the second camera 270 as a front camera and the first camera 260 as a rear camera. Also, even though the second bending portion 250 is bent, the display device may use the first camera 260 as a front camera and the second camera 270 as a rear camera in accordance with the location of the user.

As described above, the first camera 260 and the second camera 270 may be provided at a first side of the display device. In other words, both the first camera 260 and the second camera 270 may be provided at a front side or rear side of the display device. Accordingly, the display device may generate one panorama image by using a first image acquired from the first camera 260 and a second image acquired from the second camera 270 by bending the second bending portion 250 between the first camera 260 and the second camera 270.

Also, in this specification, it is defined that the bending angle becomes great as the display device of the full body screen state is bent. For example, it may be assumed that the bending angle of the display device of the full body screen state is 0 degree. Accordingly, if the second bending portion 250 is bent, the bending angle may be more increased from 0 degree.

Unlike the aforementioned display device, the display device provided with only one camera may generate a panorama image by acquiring a plurality of images at a certain time difference and synthesizing the plurality of images. However, since the display device provided with only one camera acquires the images at a time difference, if an unexpected status occurs like that someone passes by while the display device is acquiring the images, the display device may fail to generate the panorama image normally.

Accordingly, the display device according to one embodiment is provided with at least two cameras to take two images at the same time without time difference, thereby generating the panorama image. In other words, since the first camera 260 and the second camera 270 acquire the images at a location spaced apart from each other as much as a previously set distance in one direction, the user may generate the panorama image through only one touch input. This will be described in detail with reference to FIG. 6 and FIG. 7.

In the meantime, the display device may generate one panorama image by synthesizing the images acquired from the first camera 260 and the second camera 270. Also, the display device may provide the user with the panorama image by displaying the panorama image on the screen located in front of the user. This will be described with reference to FIG. 4 and FIG. 5.

Figure 4:
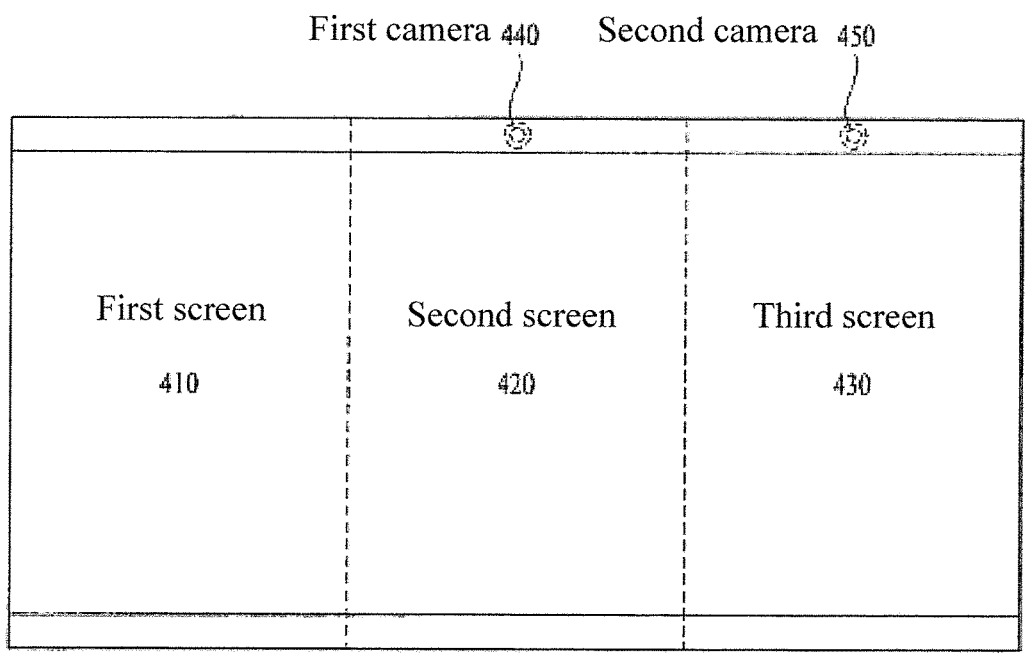
FIG. 4 is a diagram illustrating locations of a display unit, a first camera and a second camera, which are provided in a display device according to one embodiment.

FIG. 4 is a diagram illustrating locations of a display unit, a first camera and a second camera, which are provided in a display device according to one embodiment. The display device according to one embodiment may be provided with a first camera and a second camera at the rear side, and may be provided with a display unit at a front side opposite to the rear side.

As shown in FIG. 4, if the display device is unfolded to form a full body screen, the display device may provide a panorama image by using a first screen 410, a second screen 420 and a third screen 430. At this time, the first screen 410, the second screen 420 and the third screen 430 are divided from one another by the bending portion, and may not be spaced apart from one another physically. In other words, the first screen 410, the second screen 420 and the third screen 430 may be one connected screen.

In other words, the display device may acquire a first image and a second image at the same time by using the first camera 440 and the second camera 450, which are provided at the rear side. Also, the display device may generate the panorama image by an image processing method for the first image and the second image. Also, the display device may display the generated panorama image on at least one of the first screen 410, the second screen 420 and the third screen 430. Accordingly, the user may immediately view the panorama image and may easily determine whether to store the panorama image. This is especially useful when at least two cameras and the display screen are located at different sides of the display device.

Figure 5:
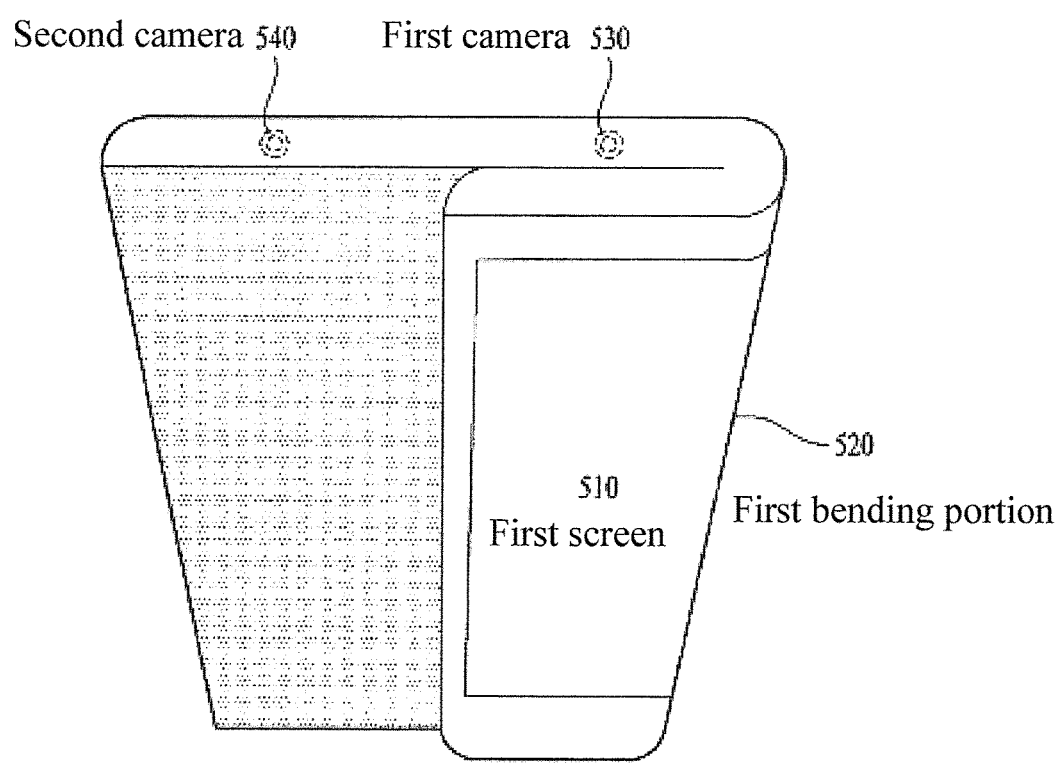
FIG. 5 is a diagram illustrating locations of a display unit, a first camera and a second camera, which are provided in a display device according to another embodiment.

FIG. 5 is a diagram illustrating locations of a display unit, a first camera and a second camera, which are provided in a display device according to another embodiment. The display device according to another embodiment may be provided with a first camera and a second camera at the front side.

As shown in FIG. 5, if a first bending portion 520 of the display device is bent, the display device may provide a panorama image by using a first screen 510 located at the front side of the user. In other words, the display device may acquire a first image from a first camera 530 and a second image from a second camera 540 at the same time and generate the panorama image by using the first image and the second image. Also, the display device may allow the user to previously view the panorama image by displaying the panorama image on the first screen 510. This is especially useful when at least two cameras and the display screen are located at the same side of the display device.

However, for convenience of description, the case where at least two cameras are provided at the side different from the display screen will be described as, but not limited to, a main embodiment.

In the meantime, in case of the display device according to one embodiment, a range of images that may be acquired using the first camera and the second camera may be varied depending on the bending angle of the second bending portion. This will be described with reference to FIG. 6 to FIG. 10. In FIG. 6 to FIG. 10, the display device includes, but not limited to, two bending portions, a first bending portion and a second bending portion as one embodiment. In other words, the display device according to one embodiment may achieve its object even though it includes one bending portion.

Figure 6:
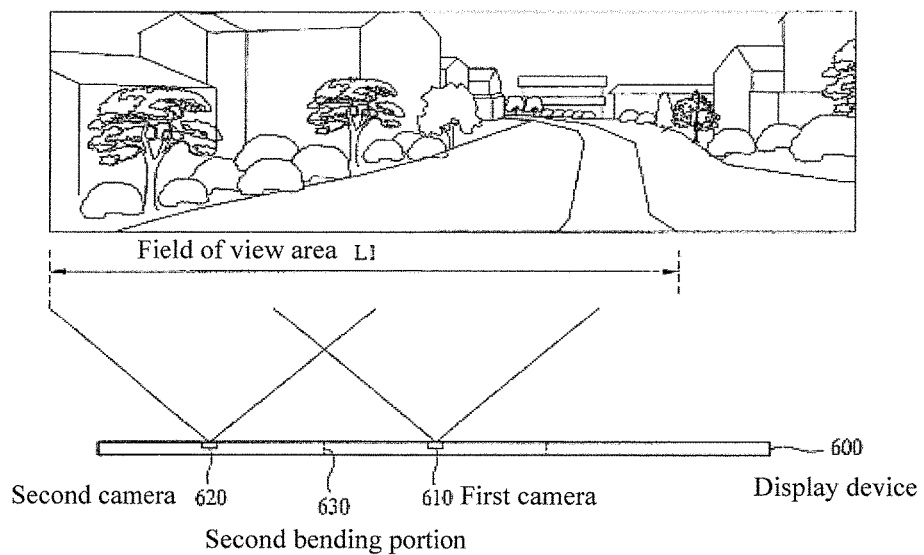
FIG. 6 is a diagram illustrating an example that a display device which is not bent generates a panorama image.

FIG. 6 is a diagram illustrating an example that a display device which is not bent generates a panorama image.

As shown in FIG. 6, the display device 60, which is unfolded without being bent, may generate an image longer than that to be taken by one camera, by using the first camera 610 and the second camera 620. In other words, the display device may generate one long panorama image by image-processing a portion where the first image acquired from the first camera 610 and the second image acquired from the second camera 620 overlap each other.

As described above, there may occur the portion where the first image acquired from the first camera 610 and the second image acquired from the second camera 620 overlap each other, due to the physical distance between the first camera 610 and the second camera 620. At this time, the display device may generate the longer panorama image as the overlapped portion is more minimized. In other words, the display device may generate the longer panorama image to minimize repetition of the field of view area of the first camera 610 and the field of view area of the second camera 620. Accordingly, the display device according to one embodiment may generate the longer panorama image by bending the second bending portion 630 provided between the first camera 610 and the second camera 620.

In the meantime, the display device may generate 3D image by partially using the second image partially overlapped with the first image. Since the first camera 610 and the second camera 620 take the same direction but are spaced apart from each other at some distance, the second camera 620 may generate an image viewed from the left eye of the user, and the first camera 610 may generate an image viewed from the right eye of the user. Accordingly, the display device may generate the 3D image by using the image generated through the first camera 610 and the second image 620.

Accordingly, the display device may include the 3D image in the panorama image generated using the first image and the second image. In other words, the display device may generate the panorama image such that the portion where the first image and the second image overlap each other may become the 3D image.

Figure 7:
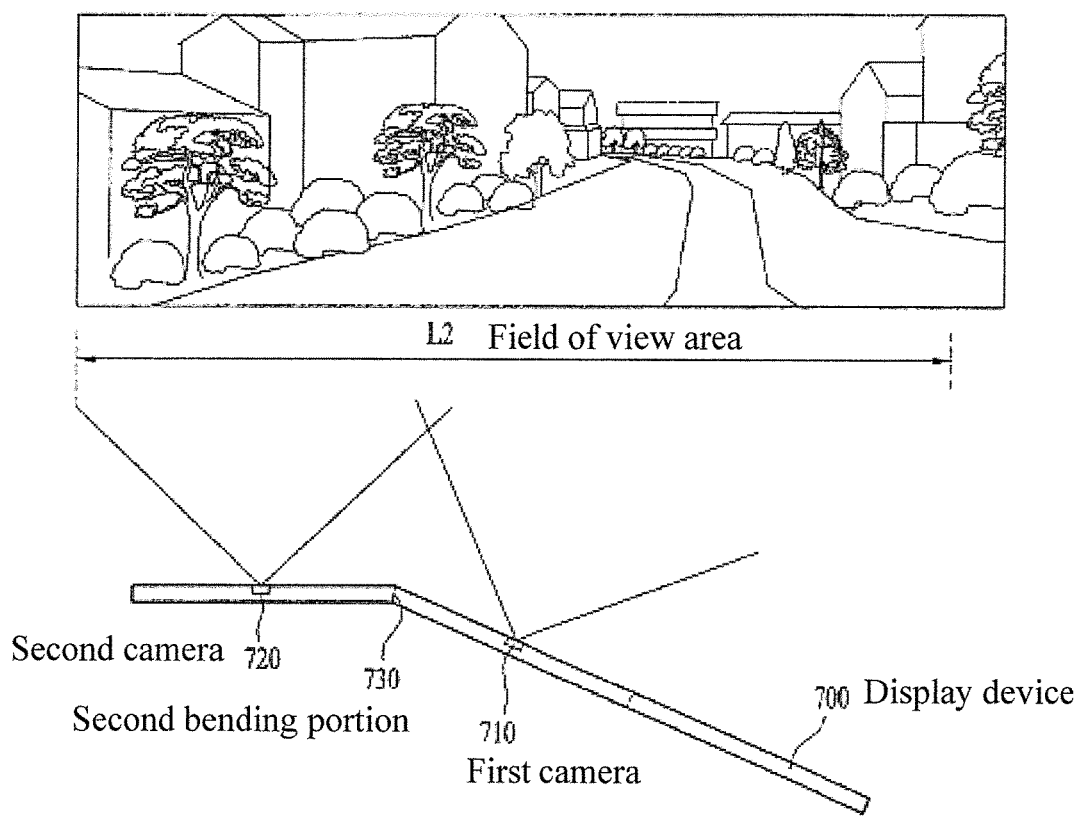
FIG. 7 is a diagram illustrating an example that a display device which is bent generates a panorama image.

FIG. 7 is a diagram illustrating an example that a display device which is bent generates a panorama image.

As shown in FIG. 7, the display device 700 of which second bending portion 730 is bent may generate a panorama image longer than that acquired by one camera, by using the first camera 710 and the second camera 720. Also, as compared with FIG. 6, the direction in which the first camera 710 acquires an image is varied by the first bending portion 730. Accordingly, the portion where the first image acquired from the first camera 710 and the second image acquired from the second camera 720 overlap each other may be reduced.

In other words, according to FIG. 6, a range of a view corresponding to the panorama image generated by the field of view areas of the first camera 610 and the second camera 620 is L1. According to FIG. 7, a range of a view corresponding to the panorama image generated by the field of view areas of the first camera 710 and the second camera 720 is L2. In other words, the display device 700 may reduce the portion where the field of view areas of the first camera 710 and the second camera 720 overlap each other, by bending the second bending portion 730. Accordingly, the display device 700 which is bent may generate the panorama image of which horizontal length is longer than that of the panorama image generated by the display device 600 which is not bent.

Hereinafter, a procedure of varying the field of view areas of the first camera and the second camera in accordance with the bending angle of the second bending portion of the display device and a range of a subject based on variation of the field of view areas will be described with reference to FIG. 8 to FIG. 10.

Figure 8:
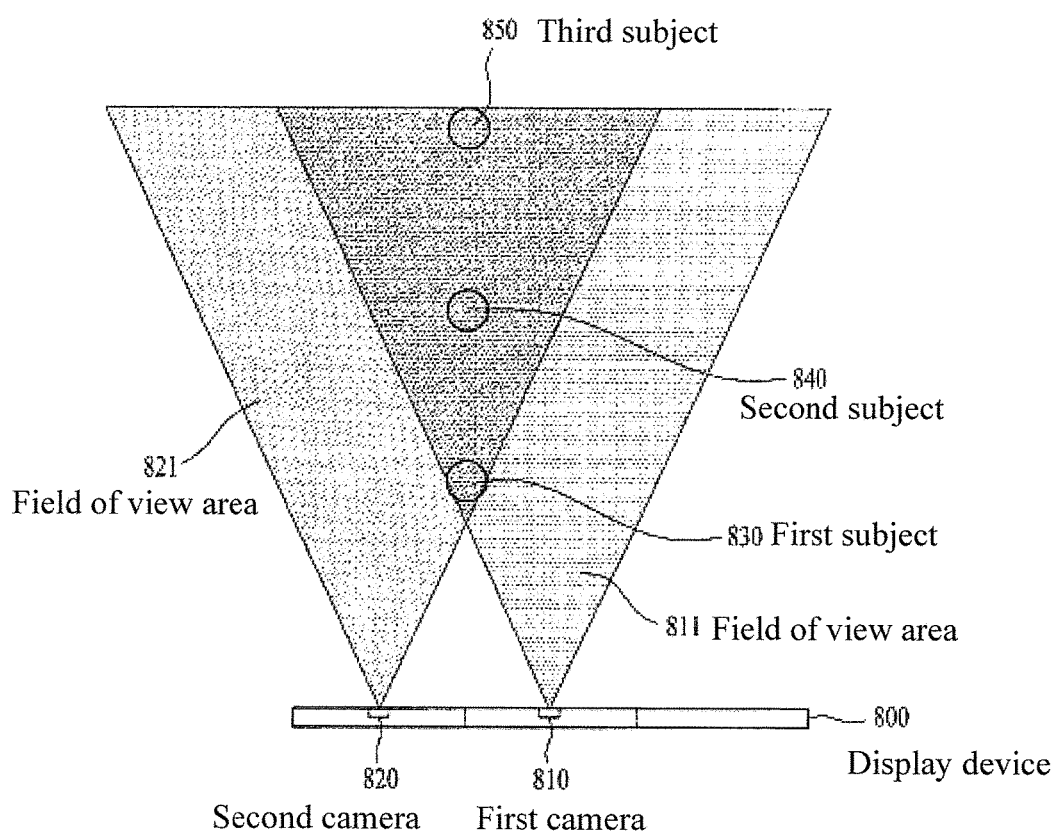
FIG. 8 is a diagram illustrating an example of a field of view area of a display device which is not bent and a subject based on the field of view area.

First of all, FIG. 8 is a diagram illustrating an example of a field of view area of a display device which is not bent and a subject based on the field of view area.

The first camera 810 may acquire the first image corresponding to its field of view area 811, and the second camera 820 may acquire the second image corresponding to its field of view area 821. At this time, it is assumed that a first subject 830, a second subject 840 and a third subject 850 are located in due order to be close to the display device 800.

The first subject 830, the second subject 840 and the third subject 850 may all be included in the field of view area 811 of the first camera 810 and the field of view area 821 of the second camera 820. Accordingly, one panorama image generated using the first image and the second image by the display device 800 may include all of the first subject 830, the second subject 840 and the third subject 850.

Figure 9:
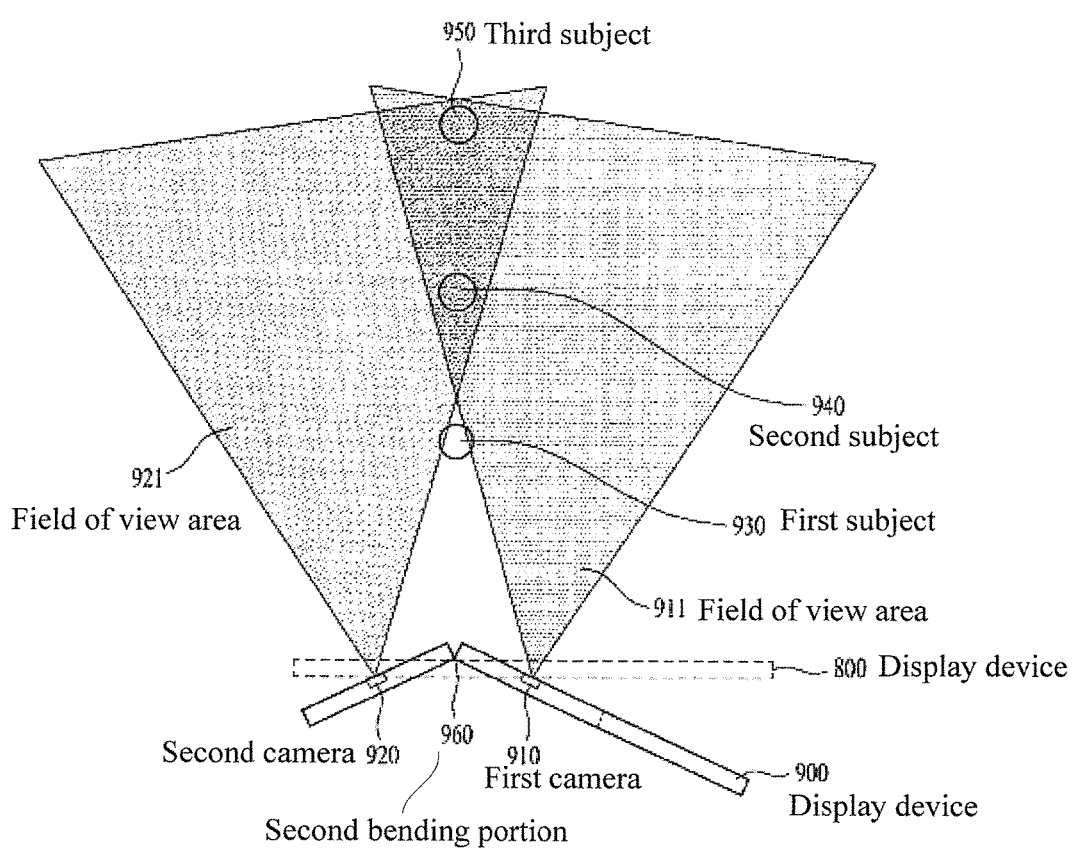
FIG. 9 is a diagram illustrating an example of a field of view area of a display device of which second bending portion is bent at a first angle, and a subject based on the field of view area.

FIG. 9 is a diagram illustrating an example of a field of view area of a display device of which second bending portion is bent at a first angle, and a subject based on the field of view area.

The first camera 910 may acquire the first image corresponding to its field of view area 911, and the second camera 920 may acquire the second image corresponding to its field of view area 921. Also, it is assumed that a first subject 930, a second subject 940 and a third subject 950 are located in due order to be close to the display device 900.

Since the second subject 940 and the third subject 950 are included in both the field of view area 911 of the first camera 910 and the field of view area 921 of the second camera 920, they may be included in the panorama image. However, as the second bending portion 960 of the display device 900 is bent, the first subject 930 is not included in the field of view area 911 of the first camera 910 and the field of view area 921 of the second camera 920. Accordingly, the first subject 930 cannot be included in the panorama image.

Figure 10:
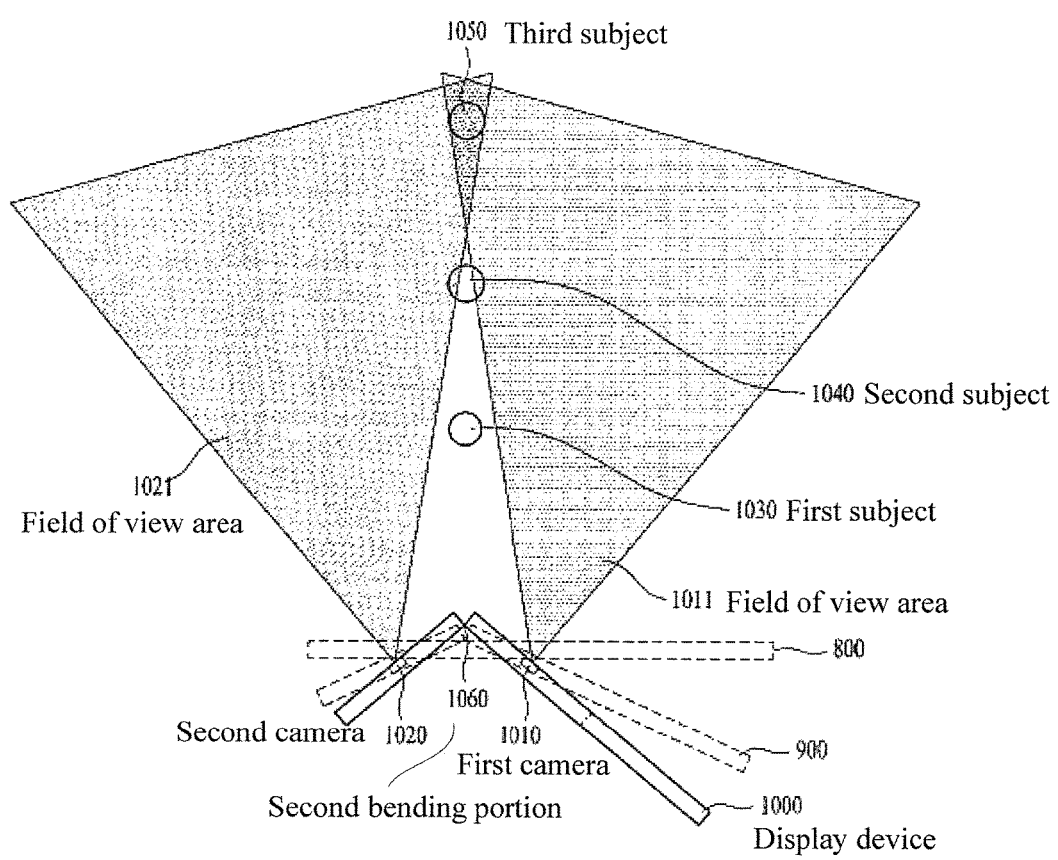
FIG. 10 is a diagram illustrating an example of a field of view area of a display device of which second bending portion is bent at a second angle, and a subject based on the field of view area.

FIG. 10 is a diagram illustrating an example of a field of view area of a display device of which second bending portion is bent at a second angle, and a subject based on the field of view area. In this case, it is assumed that the second angle is greater than the first angle.

The first camera 1010 may acquire the first image corresponding to its field of view area 1011, and the second camera 1020 may acquire the second image corresponding to its field of view area 1021. Also, it is assumed that a first subject 1030, a second subject 1040 and a third subject 1050 are located in due order to be close to the display device 1000.

Since the third subject 1050 is included in both the field of view area 1011 of the first camera 1010 and the field of view area 1021 of the second camera 1020, it may be included in the panorama image. However, as the second bending portion 1060 of the display device 1000 is bent, the first subject 1030 and the second subject 1040 are not included in the field of view area 1011 of the first camera 1010 and the field of view area 1021 of the second camera 1020. Accordingly, the first subject 1030 and the second subject 1040 cannot be included in the panorama image.

As described with reference to FIG. 8 to FIG. 10, if the bending angle of the second bending portion of the display device becomes great, the display device may generate the longer panorama image. However, if the bending angle of the second bending portion of the display device becomes great, it may be difficult for the subject, which is located to be closest to the display device, to be included in the panorama image.

Accordingly, the display device may first determine the subject to be included in the panorama image before the panorama image is generated, and may set a threshold angle for generating the panorama image in accordance with the subject. At this time, the display device may receive the subject, which will be included in the panorama image and selected by the user, or may select the object located closest thereto.

The display device that has determined the subject may detect the distance with the subject, and may also detect the distance with the subject through various methods without limitation to a specific method. Also, the display device may adjust the threshold angle and the threshold range in accordance with the distance with the detected subject. The threshold angle is the maximum bending angle that may generate one panorama image by using the first image acquired from the first camera and the second image acquired from the second camera. Also, the threshold range is the angle range from the current bending angle of the display device to the threshold angle.

In the meantime, the display device may determine a first object, which will be the subject, among at least one object located at the distance that may generate the panorama image, in accordance with the current bending angle of the bending portion. The display device may select a first object group, which may be the subject in both the first camera and the second camera, from at least one object, and may determine the object, which is located to be closest to the display device, as the first object.

Alternatively, the display device may display at least one object located at the distance that may generate the panorama image, in accordance with the current bending angle of the bending portion. Also, the display device may receive a signal for selecting a second object from the at least one object. In other words, the user may select a subject for generating the panorama image, from the at least one object which is displayed. As a result, the display device may acquire the first image, which includes the second object, through the first camera, and may acquire a second image, which includes the second object, through the second camera.

As described above, the display device according to one embodiment may determine the subject, which is located to generate the panorama image, at the current bending angle of the bending portion, and may receive the signal for selecting the subject for the panorama image from the user. At this time, the subject which is located to generate the panorama image may be varied by magnification of the first camera and the second camera as well as the bending angle.

In other words, the display device may include a desired subject through zoom control in addition to the method for adjusting the bending angle of the second bending portion.

FIG. 11 is a diagram illustrating an example that a field of view area is varied depending on a zoom magnification of a camera.

(a) of FIG. 11 illustrates an example that a first camera 1110 and a second camera 1120 have high magnification, and (b) of FIG. 11 illustrates an example that a first camera 1130 and a second camera 1140 have low magnification. It is assumed that a first subject 1150, a second subject 1160 and a third subject 1170 are located in due order to be close to the display device.

The camera of low magnification has a field of view area narrower than that of the camera of high magnification. Accordingly, the first subject 1150, the second subject 1160 and the third subject 1170 may be included in the field of view area of the first camera 1110 and the field of view area of the second camera 1120. However, the field of area of the first camera 1130 and the field of area of the second camera 1140 in the display device according to (b) of FIG. 11 do not include the third subject 1170 only. In other words, the field of area of the first camera 1130 and the field of view area of the second camera 1140 do not include the first subject 1150 and the second subject 1160.

Accordingly, the display device may adjust the threshold angle to be smaller if magnification of the first camera 1110 and the second camera 1120 is greater than a previously set magnification. Also, the display device may adjust the threshold angle to be greater if magnification of the first camera 1130 and the second camera 1140 is smaller than the previously set magnification. The previously set magnification may be varied depending on the subject that will generate the panorama image.

As described above, the display device may adjust the threshold angle and the threshold range in accordance with magnification of the first camera and the second camera. In other words, the display device may adjust the threshold angle which is the bending angle for generating the panorama image in accordance with the magnification of the camera and adjust the threshold range in accordance with the threshold angle.

In the meantime, the user may adjust the bending angle of the second bending portion of the display device or include a desired subject in the panorama image by adjusting magnification of the camera. However, it is difficult for the user to know the bending angle that may generate the panorama image and whether the desired subject is included in the panorama image. Accordingly, the display device according to one embodiment may provide a user interface to allow the user to easily recognize the magnification of the camera and the bending angle that may generate the panorama image. This will be described with reference to FIG. 12 to FIG. 17. However, at this time, it is assumed that the display device determines the subject which will be acquired as the image.

First of all, the display device may acquire the bending angle of the second bending portion to provide the user interface that may allow the user to easily recognize the magnification of the camera and the bending angle that may generate the panorama image.

The display device may acquire the bending angle from the sensor unit that senses the bending angle of the second bending portion. Alternatively, the display device may calculate the bending angle of the second bending portion by using at least one of the size of the portion where the first image acquired from the first camera and the second image acquired from the second camera overlap each other, the distance between the first camera and the second camera, and the magnification of the camera. Hereinafter, one embodiment of the user interface provided in accordance with the bending angle sensed or calculated by the display device will be described.

FIG. 12 is a diagram illustrating an example that a display device which is not bent displays a panorama image.

As shown in (a) of FIG. 12, the display device may maintain a bending portion 1210 in a full body screen type without bending the bending portion 1210. Also, the display device may generate one panorama image by using a first image acquired from a first camera 1250 and a second image acquired from a second camera 1260.

The display device may display the generated panorama image 1270 on a first screen 1220, a second screen 1230, and a third screen 1240. However, the display device may provide the panorama image 1270 by using the first screen 1220 and the second screen 1230 as shown in (b) of FIG. 12 to provide the same user interface as that allows the bent display device to provide the panorama image.

The display device of the full body screen type as shown in (a) of FIG. 12 may adjust field of view areas of the first camera 1250 and the second camera 1260 to be greater by bending the bending portion 1210. Accordingly, the display device may provide the user interface that may allow the user to recognize that the field of view areas may be enlarged through bending.

Accordingly, the user interface may adjust display attributes of the panorama image 1270 in accordance with the threshold range. The threshold range means the range from the current bending angle of the bending portion 1210 to the threshold angle. The bending angle of the display device of the full body screen type as shown in (a) of FIG. 12 may be defined as 0 degree.

The display attributes may include at least one of resolution of the panorama image 270, a ratio of a horizontal length of the panorama image 1270 to a vertical length, and a size of an empty area that may be enlarged in accordance with the threshold range.

Accordingly, as shown in (b) of FIG. 12, the display device may display the size of the panorama image 1270 to be smaller in the user interface that provides the panorama image 1270. In other words, the display device may provide the empty area, which may be enlarged in accordance with the threshold range, by displaying the size of the panorama image 1270 to be smaller. The empty area may be greater if the threshold range becomes greater, and may be smaller if the threshold range becomes smaller.

Accordingly, the user may easily know that the longer panorama image may be acquired if the bending angle becomes greater, through the empty area in the periphery of the panorama image 1270. In other words, the size of the empty area in the periphery of the panorama image 1270 may be dependent on the threshold range.

FIG. 13 is a diagram illustrating an example that a display device bent at a first angle displays a panorama image.

As shown in (a) of FIG. 13, the display device may bend the bending portion 1210 at a first bending angle 1300a.

Also, if the first bending angle 1300a is smaller than the threshold angle for generating the panorama image, the display device may generate the panorama image by using the first image acquired through the first camera 1250 on the rear side and the second image acquired through the second camera 1260 on the rear side. Also, the display device may display the generated panorama image 1310 as shown in (b) of FIG. 13.

The display device may enlarge the field of view areas of the first camera 1250 and the second camera 1260 by adjusting the bending angle of the bending portion 1210. Accordingly, the display device may provide the user interface, which may allow the user to recognize that the field of view areas may be more enlarged, by adjusting the bending angle. The user interface may adjust the display attributes of the panorama image 1310 in accordance with the threshold range as described above.

Accordingly, as shown in (b) of FIG. 13, the display device may display the size of the panorama image 1310 at the size greater than that of the panorama image 1270 of (b) of FIG. 12 in the user interface that provides the panorama image 1310. In other words, the display device may adjust the image of the panorama image to be smaller if the threshold range is greater than the previously set reference, and may adjust the size of the panorama image to be greater if the threshold range is smaller than the previously set reference.

As described above, the display device may reduce the size of the empty area that may be enlarged in accordance with the threshold range, by enlarging the size of the panorama image 1310. In other words, as the bending angle is enlarged, the threshold range is reduced, and the size of the empty area may be smaller to correspond to the reduced threshold range.

Accordingly, through the empty area in the periphery of the panorama image 1310, the user may easily know that the longer panorama image may be acquired by adjusting the bending angle, and may also easily know that the display device may be unfolded in a full body screen type.

In the meantime, if the bending angle is equal to the threshold angle, the display device may display the panorama image at a maximum size which is previously set. Accordingly, the user may easily know that the display device has been bent at the maximum bending angle, by identifying that there is no empty area in the periphery of the panorama image.

FIG. 14 is a diagram illustrating an example that a display device bent at a second angle provides a user interface.

As shown in (a) of FIG. 14, the display device may bend the bending portion 1210 at a second bending angle 1400a. However, if the second bending angle 1400a is greater than the threshold angle for generating the panorama image, the display device may provide the user interface that may allow the user to recognize that the panorama image cannot be generated.

The user interface may display a first image 1410 and a second image 1420 separately from each other and provide a third image, which includes an empty area, between the first image 1410 and the second image 1420. In particular, as shown in (b) of FIG. 14, the display device may provide a graphic effect of a torn image in an area of the first image 1410 and the second image 1420, where is adjacent to the empty area. In other words, the display device may provide the effect of the torn panorama image by displaying the first image 1410 and the second image 1420 separately from each other. Accordingly, the display device may guide the user to narrow the bending angle, whereby the torn areas may be attached with each other.

As described above, by adjusting the size of the panorama image, the display device may allow the user to easily know whether a panorama image of a wider view may be generated or not. Accordingly, the display device according to one embodiment may provide various types of interfaces in addition to the aforementioned example.

For example, the display device may provide an indicator, which indicates the threshold range, in the user interface that provides the panorama image. The indicator may include a graphic object in which at least one of a length and a width is adjusted in accordance with the threshold range. This will be described with reference to FIG. 15 and FIG. 16.

FIG. 15 is a diagram illustrating an example that a display device which is not bent provides an indicator.

(a) of FIG. 15 illustrates one embodiment of a display device of a full body screen type in the same manner as (a) of FIG. 12. However, unlike (a) of FIG. 12, the display device may display a panorama image 1510 at a greater size so that an empty area may not occur in the periphery of the panorama image 1510. However, as shown in (b) of FIG. 15, the display device may provide an indicator, which indicates the threshold range, whereby the user may know that a panorama image of a wider view may be generated.

The indicator according to (b) of FIG. 15 may include a graphic object 1511 of a folded type at both ends of the panorama image 1510. Accordingly, the user may estimate the bending angle through the graphic object 1511 which is folded at both ends of the panorama image 1510.

In this way, the display device may display the panorama image 1510 at a great size, and may provide a status that may allow the user to view the panorama image better, by indicating the threshold range through a separate indicator.

FIG. 16 is a diagram illustrating an example that a display device bent at a first angle provides an indicator.

(a) of FIG. 16 illustrates one embodiment of the display device of which bending portion 1210 is bent at a first bending angle 1600*a* as shown in (a) of FIG. 13. However, unlike (b) of FIG. 13, the display device may display a panorama image 1610 at a greater size so that an empty area may not occur in the periphery of the panorama image 1610. However, as shown in (b) of FIG. 16, the display device may provide an indicator, which indicates the threshold range, whereby the user may know that a panorama image of a wider view may be generated.

The indicator according to (b) of FIG. 16 may include a graphic object 1611 of a folded type at both ends of the panorama image 1610. However, the display device may display the graphic object 1611 according to (b) of FIG. 16 to be folded at a range smaller than that of the graphic object 1511 according to (b) of FIG. 15, whereby the user may easily recognize the difference. In other words, through the graphic object of the folded type, the user may know that the panorama image of the longer view may be generated. In this case, the user may easily know that the bending angle is close to the threshold angle if the folded portion is small.

FIG. 17 is a diagram illustrating another example that a display device bent at a second angle provides a user interface.

As shown in (a) of FIG. 17, the display device may bend the bending portion 1210 at a second bending angle 1700*a*. However, if the second bending angle 1700*a* is greater than the threshold angle for generating the panorama image, the display device may provide the user interface that may allow the user to recognize that the panorama image cannot be generated.

The user interface may display a first image 1710 and a second image 1720 separately from each other and provide a third image, which includes an empty area, between the first image 1710 and the second image 1720. In other words, the display device may display the first image 1410 and the second image 1420 separately from each other to guide the user to narrow the bending angle, whereby the user may attach the torn areas with each other.

As described above, the display device may provide an indicator for generating the panorama image. The indicator may be provided in a graphic type, or may be provided in various types that include audio, a tactile feedback type of the display unit, etc.

For example, the indicator may be provided in an audio data or graphic data type to indicate a bending direction of the bending portion, whereby the bending angle may be reduced. Also, the indicator may be provided in a type of an interface for adjusting magnification, to reduce magnification of the first camera and the second camera. The interface for adjusting magnification may include audio data or graphic data.

Also, the indicator may indicator a subject corresponding to the threshold angle. Accordingly, the display device may provide the user interface that may allow the user to select the subject or adjust the threshold angle.

In the meantime, as the bending angle of the display device becomes great, the range of the view acquired as the panorama image becomes wider. Accordingly, one embodiment for displaying the panorama image in accordance with variation of the bending angle will be described hereinafter.

FIG. 18 is a diagram illustrating an example of a display device bent at a first angle and a second angle, and FIG. 19 is a diagram illustrating an example of a panorama image displayed in accordance with a bending angle of FIG. 18.

(a) of FIG. 18 illustrates one embodiment that the bending angle of the bending portion of the display device is a first bending angle 1810*a*. The display device may generate a first panorama image by using a first image acquired from a first camera and a second image acquired from a second camera. As shown in (a) of FIG. 19, the display device may display the first panorama image 1910 in a first display area.

Since the first bending angle 1810*a* is smaller than the threshold angle, the display device may indicate the threshold range by adjusting display attributes of the panorama image in accordance with the threshold range. As a result, as shown in (a) of FIG. 19, the display device may provide an empty area, which may be enlarged to correspond to the threshold range, in the periphery of the panorama image 1910.

(b) of FIG. 18 illustrates one embodiment that the bending angle of the bending portion of the display device is a second bending angle 1810*b*. It is assumed that the second bending angle 1810*b* is greater than the first bending angle 1810*a*.

The display device may generate a second panorama image by using the first image and the second image. As shown in (b) of FIG. 19, the display device may display the second panorama image 1920 in a second display area.

At this time, the display device may set a first vertical length of the first display area equally to a second vertical length of the second display area. Also, the display device may set a horizontal length of the first display area differently from a second horizontal length of the second display area. For example, since the second panorama image 1920 corresponds to a view wider than that of the first panorama image 1910, the display device may set the second horizontal length of the second display area to be longer than the first horizontal length of the first display area.

Accordingly, a length 1911 of an up and down empty area in the periphery of the first panorama image 1910 may be equal to a length 1921 of an up and down empty area in the periphery of the second panorama image 1920. On the other hand, a length 1913 of a left and right empty area in the periphery of the first panorama image 1910 may be different from a length 1923 of a left and right empty area in the periphery of the second panorama image 1920. In other words, the length of the left and right empty area in the periphery of the second panorama image 1920 may be shorter than the length 1913 of the left and right empty area in the periphery of the first panorama image 1910.

As described above, the display device according to one embodiment may display the horizontal length of the panorama image, which corresponds to the wider field of view area, to be longer than any other images in accordance with variation of the bending angle. However, the display device may equally display the vertical lengths of the panorama images to maintain unique features of the panorama images.

Figure 20:
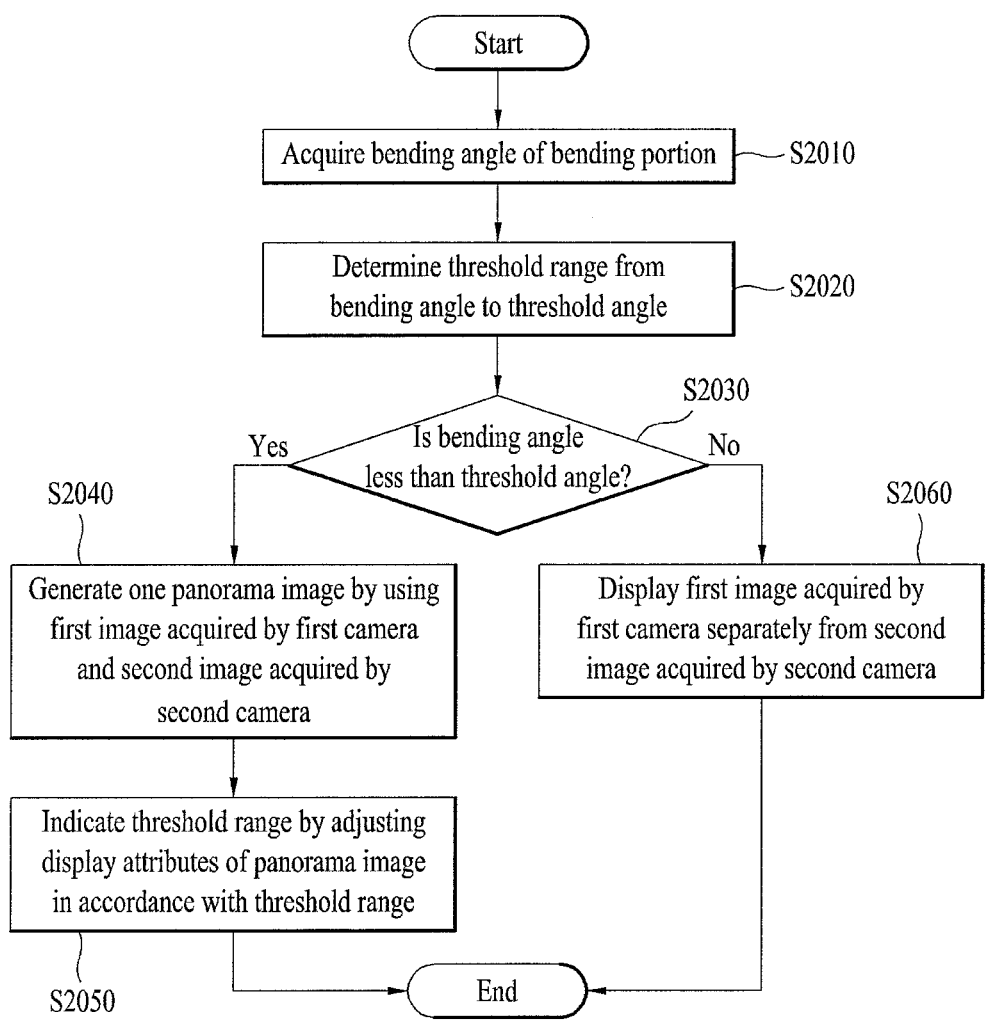
FIG. 20 is a flow chart illustrating a method for controlling a display device according to one embodiment.

FIG. 20 is a flow chart illustrating a method for controlling a display device according to one embodiment.

First of all, the display device may acquire the bending angle of the bending portion (S2010). One bending portion may be provided in the display device, or a plurality of bending portions may be provided in the display device. The display device may acquire the bending angle from the sensor unit that senses the bending angle of the bending portion. Also, the display device may calculate the bending angle on the basis of the area where the first image acquired from the first camera and the second image acquired from the second camera overlap with each other.

As described with reference to FIG. 6 to FIG. 11, the display device may determine the threshold range from the bending angle to the threshold angle (S2020).

The bending angle means an angle obtained as the display device of a full body screen state is bent. When the bending angle of the display device of the full body screen state is defined as 0 degree, it is defined that the bending angle becomes great as the display device is bent.

The threshold angle means the maximum bending angle that may generate one panorama image by using the first image acquired from the first camera and the second image acquired from the second camera. Accordingly, the threshold range means the range from the current bending angle of the display device to the threshold angle.

As described with reference to FIG. 2 to FIG. 5, the first camera may be provided in the first area of the body of the display device, and the second camera may be provided in the second area of the body of the display device. At this time, the first area of the body and the second area of the body may be identified from each other by the bending portion between the first area and the second area.

As described with reference to FIG. 13 and FIG. 16, the display device may determine whether the bending angle is less than the threshold angle (S2030). If the bending angle is less than the threshold angle, the display device may generate one panorama image by using the first image acquired from the first camera and the second camera acquired from the second camera (S2040).

As described with reference to FIG. 13 and FIG. 16, the display device may indicate the threshold range by adjusting the display attributes of the panorama image in accordance with the threshold range (S2050).

If the bending angle is greater than the threshold angle, the display device may display the first image acquired from the first camera separately from the second image acquired from the second camera (S2060). At this time, the display device may display the third image, which includes an empty area, between the first image and the second image.

FIG. 21 is a flow chart illustrating a method for controlling a display device according to another embodiment.

First of all, the display device may determine the distance with a subject to be captured as the panorama image (S2110). As described with reference to FIG. 8 to FIG. 11, the subject may be varied depending on the bending angle of the bending portion of the display device, the field of view areas of the first camera and the second camera, and zoom magnification of the first camera and the second camera. Accordingly, the display device may determine the subject to be captured as the panorama image, and may determine the distance with the subject.

For example, the display device may determine the subject in accordance with the input of the user. Accordingly, the display device may determine the bending angle and zoom magnification to generate the panorama image that includes the subject.

Accordingly, in accordance with the current bending angle and current zoom magnification, the display device may provide an indicator for guiding at least one of bending angle adjustment, zoom magnification adjustment, and subject change to generate the panorama image if the subject is not included in the panorama image.

For another example, the display device may determine a specific object, which is located to be closest thereto, among at least one object included in both the first image acquired from the first camera and the second image acquired from the second camera, as the subject. Also, the display device may set the threshold angle in accordance with the distance with the subject, whereby the subject may be included in the panorama image. Accordingly, if the current bending angle of the display device is greater than the threshold angle, as shown in (b) of FIG. 14 and (b) of FIG. 17, the display device may indicate that the panorama image cannot be generated.

Also, the display device may determine whether the current bending angle is less than the threshold angle (S2120). As described above, the threshold angle may be varied depending on the distance between the subject and the display device and zoom magnification.

If the bending angle is smaller than the threshold angle, the display device may determine whether it is in the full body screen state (S2130). If the display device is in the full body screen state, it may display the panorama image, which is generated using the first image and the second image, on the first screen, the second screen, and the first screen (S2140). At this time, in case of the display device provided with only one bending portion, the panorama image may be displayed on the first screen and the second screen.

If the display device is not in the full body screen state, the second bending portion of the display device is bent. Accordingly, the display device may display the panorama image on the first screen and the second screen (S2150). At this time, the display device may provide a control interface for generating the panorama image on the third screen.

Also, if the bending angle is greater than the threshold angle, the display device cannot generate the panorama image. Accordingly, the display device may display the first image separately from the second image as shown in (b) of FIG. 14 and (b) of FIG. 17 (S2160). Accordingly, the user may easily know that the panorama image cannot be generated, and may easily recognize that the bending angle or zoom magnification should be adjusted.

Although the description may be made for each of the drawings for convenience of description, the embodiments of the respective drawings may be incorporated to achieve a new embodiment. Also, a computer readable recording medium where a program for implementing the embodiments is recorded may be designed in accordance with the need of the person skilled in the art within the scope of the present specification.

Also, the display device and the method for controlling the same are not limited to the aforementioned embodiments, and all or some of the aforementioned embodiments may selectively be configured in combination so that various modifications may be made in the aforementioned embodiments.

In the meantime, the method for controlling the display device may be implemented in a recording medium, which can be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, in this specification, both the product invention and the method invention have been described, and description of both inventions may be made complementally if necessary.

What is claimed is:

1. A display device comprising:
a body configured to include a first area, a second area and a bending portion between the first area and the second area;
a first camera configured to be provided in a first area;
a second camera configured to be provided in a second area, the first camera and the second camera being provided at a first side of the display device;
a display unit configured to display images acquired through the first camera and the second camera; and
a processor configured to control the first camera, the second camera and the display unit,
wherein the processor is further configured to:
acquire a bending angle of the bending portion,
determine a threshold range from the bending angle to a threshold angle, wherein the threshold angle is a specific bending angle of the bending portion to generate a single panorama image by using a first image acquired from the first camera and a second image acquired from the second camera,
generate the panorama image by using the first image and the second image if the bending angle is smaller than the threshold angle,
adjust display attributes of the panorama image in accordance with the threshold range, and
change a size of an empty area in a periphery of the panorama image in response to a change in the threshold range, and
wherein the size of the empty area in the periphery of the panorama image is dependent on the threshold range.

2. The display device according to claim 1, wherein the processor adjusts the threshold angle and the threshold range in accordance with a first magnification of the first camera and a second magnification of the second camera.

3. The display device according to claim 1, wherein the processor adjusts the threshold angle to be smaller if a first magnification of the first camera and a second magnification of the second camera is greater than a preset magnification, and adjusts the threshold angle to be greater if the first magnification of the first camera and the second magnification of the second camera is smaller than the preset magnification.

4. The display device according to claim 1, wherein the processor determines a subject detects a distance with the subject, and adjusts the threshold angle and the threshold range in accordance with the distance.

5. The display device according to claim 1, wherein the processor determines a first object, which will be a subject, among at least one object located at a distance that may generate the panorama image according to the bending angle.

6. The display device according to claim 1, wherein the processor displays at least one object located at a distance that may generate the panorama image according to the bending angle, receives a signal for selecting a second object of the at least one object as a subject, and acquires an image of the second object by using the first camera and the second camera.

7. The display device according to claim 1, wherein the display attributes of the panorama image include at least one of a size of the panorama image, a resolution of the panorama image, and a ratio of a horizontal length of the panorama image to a vertical length.

8. The display device according to claim 1, wherein the processor adjusts a size of the panorama image to be smaller if the threshold range is greater than a preset reference, and adjusts the size of the panorama image to be greater if the threshold range is smaller than the preset reference.

9. The display device according to claim 1, wherein the processor displays the panorama image at a preset maximum size if the bending angle is equal to the threshold angle.

10. The display device according to claim 1, wherein the processor provides an indicator indicating the threshold range.

11. The display device according to claim 10, wherein the indicator includes a graphic object of which at least one of a length and a width is adjusted in accordance with the threshold range.

12. The display device according to claim 1, wherein the processor displays the first image, the second image, and a third image which includes an empty area between the first image and the second image, if the bending angle is greater than the threshold angle.

13. The display device according to claim 1, wherein the processor provides an indicator for generating the panorama image if the bending angle is greater than the threshold angle.

14. The display device according to claim 13, wherein the indicator indicates a bending direction of the bending portion to reduce the bending angle.

15. The display device according to claim 13, wherein the indicator indicates an interface for adjusting magnification to reduce a first magnification of the first camera and a second magnification of the second camera.

16. The display device according to claim 13, wherein the indicator indicates a subject according to the threshold angle.

17. The display device according to claim 1, wherein the panorama image includes a 3D image generated by partially using the second image partially overlapped with the first image.

18. The display device according to claim 1, wherein the display unit includes a flexible display screen, and is provided at the first side or a second side opposite to the first side.

19. A method for controlling a display device, which includes a body configured to include a first area and a second area and a bending portion between the first area and the second area, the method comprising;

acquiring a bending angle of a bending portion;

determining a threshold range from the bending angle to a threshold angle, wherein the threshold angle is a specific bending angle of the bending portion to generate one panorama image by using a first image acquired from a first camera and a second image acquired from a second camera;

generating the panorama image by using the first image and the second image if the bending angle is smaller than the threshold angle;

adjusting display attributes of the panorama image in accordance with the threshold range; and changing a size of an empty area in a periphery of the panorama image in response to a change in the threshold range, wherein the size of the empty area in the periphery of the panorama image is dependent on the threshold range.

\* \* \* \* \*